(12) United States Patent
Kwon et al.

(10) Patent No.: US 9,780,386 B2
(45) Date of Patent: Oct. 3, 2017

(54) COMPOSITE FOR LITHIUM AIR BATTERY, METHOD OF PREPARING THE COMPOSITE, AND LITHIUM AIR BATTERY EMPLOYING POSITIVE ELECTRODE INCLUDING THE COMPOSITE

(71) Applicant: Samsung Electronics Co., Ltd., Suwon-si, Gyeonggi-do (KR)

(72) Inventors: Soonchul Kwon, Hwaseong-si (KR); Dongjin Ham, Hwaseong-si (KR); Victor Roev, Suwon-si (KR); Dongmin Im, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 33 days.

(21) Appl. No.: 14/818,665

(22) Filed: Aug. 5, 2015

(65) Prior Publication Data

US 2016/0043408 A1 Feb. 11, 2016

(30) Foreign Application Priority Data

Aug. 8, 2014 (KR) .................. 10-2014-0102625
May 14, 2015 (KR) .................. 10-2015-0067600

(51) Int. Cl.
| | |
|---|---|
| *H01M 4/90* | (2006.01) |
| *H01M 12/08* | (2006.01) |
| *C01B 21/082* | (2006.01) |
| *C04B 35/58* | (2006.01) |
| *H01M 4/86* | (2006.01) |

(52) U.S. Cl.
CPC ....... *H01M 4/9091* (2013.01); *C01B 21/0828* (2013.01); *C04B 35/58007* (2013.01); *C04B 35/58021* (2013.01); *H01M 12/08* (2013.01); *C01P 2002/72* (2013.01); *C01P 2004/03* (2013.01); *C01P 2004/04* (2013.01); *C01P 2004/64* (2013.01); *C01P 2004/86* (2013.01); *C01P 2006/16* (2013.01);
(Continued)

(58) Field of Classification Search
CPC ... H01M 4/9091; H01M 4/8605; H01M 12/08
See application file for complete search history.

(56) References Cited

U.S. PATENT DOCUMENTS

| | | |
|---|---|---|
| 6,355,377 B1 | 3/2002 | Sheem et al. |
| 7,282,295 B2 | 10/2007 | Visco et al. |

(Continued)

FOREIGN PATENT DOCUMENTS

| | | |
|---|---|---|
| EP | 1806805 A3 | 7/2007 |
| EP | 2717366 A1 | 4/2014 |

(Continued)

OTHER PUBLICATIONS

Korean Office Action for Korean Patent Application No. 10-2015-0067600 dated Jun. 7, 2016.
(Continued)

*Primary Examiner* — Jane Rhee
(74) *Attorney, Agent, or Firm* — Cantor Colburn LLP

(57) ABSTRACT

A composite for a lithium air battery, wherein the composite is represented by Formula 1:

$$MC_xN_{(1-x)} \quad \text{Formula 1}$$

wherein M in Formula 1 is at least one selected from a metal element and a metalloid element, and $0<x<1$.

26 Claims, 29 Drawing Sheets

(52) U.S. Cl.
CPC ..... *C04B 2235/424* (2013.01); *H01M 4/8605* (2013.01); *Y02E 60/128* (2013.01)

(56) References Cited

U.S. PATENT DOCUMENTS

| | | | |
|---|---|---|---|
| 7,691,536 | B2 | 4/2010 | Johnson |
| 7,767,345 | B2 | 8/2010 | Imagawa et al. |
| 8,129,050 | B2 | 3/2012 | Kim et al. |
| 9,236,641 | B2 | 1/2016 | Shishikura |
| 2007/0231704 | A1 | 10/2007 | Inda |
| 2008/0070087 | A1 | 3/2008 | Johnson |
| 2010/0311852 | A1 | 12/2010 | Kang et al. |
| 2011/0059355 | A1 | 3/2011 | Zhang et al. |
| 2011/0129739 | A1 | 6/2011 | Nakanishi |
| 2011/0223494 | A1 | 9/2011 | Feaver et al. |
| 2012/0077084 | A1 | 3/2012 | Christensen et al. |
| 2012/0077095 | A1 | 3/2012 | Roumi et al. |
| 2012/0115048 | A1 | 5/2012 | Roev et al. |
| 2012/0141889 | A1 | 6/2012 | Lee et al. |
| 2012/0276459 | A1 | 11/2012 | Im et al. |
| 2013/0108934 | A1 | 5/2013 | Lee et al. |
| 2013/0112915 | A1* | 5/2013 | Kim .......... H01M 4/58 252/182.1 |
| 2013/0133923 | A1* | 5/2013 | Leis .......... H01G 11/38 174/126.2 |
| 2013/0147439 | A1* | 6/2013 | Takahashi .......... H01M 4/667 320/134 |
| 2013/0209348 | A1* | 8/2013 | Ludvik .......... C01B 31/10 423/460 |
| 2013/0224609 | A1 | 8/2013 | Lee et al. |
| 2013/0330639 | A1 | 12/2013 | Lee et al. |
| 2014/0011101 | A1 | 1/2014 | Ma et al. |
| 2014/0093771 | A1 | 4/2014 | Wang et al. |
| 2014/0113175 | A1* | 4/2014 | Zhang .......... H01M 4/624 429/145 |
| 2014/0234733 | A1 | 8/2014 | Roev et al. |
| 2015/0079485 | A1 | 3/2015 | Choi et al. |
| 2016/0043408 | A1 | 2/2016 | Kwon et al. |

FOREIGN PATENT DOCUMENTS

| | | |
|---|---|---|
| JP | 2001256977 A | 9/2001 |
| KR | 1020030056544 A | 7/2003 |
| KR | 1020070109118 A | 11/2007 |
| KR | 100814817 B1 | 3/2008 |
| KR | 100926794 B1 | 11/2009 |
| KR | 1020110138380 A | 12/2011 |
| KR | 1020130050711 A | 5/2013 |
| KR | 1020140002628 A | 1/2014 |
| KR | 1020140006639 A | 1/2014 |
| KR | 1020160018337 A | 2/2016 |
| WO | 2005044754 A1 | 5/2005 |

OTHER PUBLICATIONS

Jang et al., "Li metal utilization in lithium air rechargeable batteries", Journal of Power Sources, vol. 244, 2013, pp. 606-609.
Kang et al., "A Facile Mechanism for Recharging $Li_2O_2$ in $Li-O_2$ Baterries", Chemistry of Materials, vol. 25, 2013, pp. 3328-3336.
Ottakam Thotiyl et al., "A stable cathode for the aprotic $Li-O_2$ battery", Nature Materials, vol. 12, Nov. 2013 pp. 1050-1056.
Yuasa et al., "Discharge/charge characteristic of Li-air cells using carbon-supported $LaMn_{0.6}Fe_{0.4}O_3$ as an electrocatalyst", Journal of Power Sources, 242, 2013, pp. 216-221.
Extended European Search Report for European Patent Application No. 15179902.2 dated Jan. 18, 2016.
Yeh et al., "Direct formation of titanium carbonitrides by SHS in nitrogen", Ceramics International, vol. 31, 2005, pp. 719-729.

* cited by examiner

COMPOSITE FOR LITHIUM AIR BATTERY, METHOD OF PREPARING THE COMPOSITE, AND LITHIUM AIR BATTERY EMPLOYING POSITIVE ELECTRODE INCLUDING THE COMPOSITE

CROSS REFERENCE TO RELATED APPLICATION

This application claims priority to and the benefit of Korean Patent Application Nos. 10-2014-0102625, filed on Aug. 8, 2014, and 10-2015-0067600, filed on May 14, 2015, and all the benefits accruing therefrom under 35 U.S.C. §119, in the Korean Intellectual Property Office, the content of which is incorporated herein in its entirety by reference.

BACKGROUND

1. Field

The present disclosure relates to a composite for a lithium air battery, a method of preparing the composite, and a lithium air battery employing a positive electrode including the composite.

2. Description of the Related Art

A lithium air battery includes a negative electrode capable of intercalating and deintercalating lithium ions; a positive electrode capable of reducing oxygen in the air and oxidizing to form oxygen gas; and an electrolyte disposed between the positive electrode and the negative electrode. The lithium air battery uses oxygen in the air as a positive electrode active material, and because the battery need not store the positive electrode active material the lithium air battery may have a very high energy density. In this regard, the lithium air battery has received a lot of attention as a next generation battery.

During discharge of the lithium air battery, a metal oxide is produced by a reaction between a metal, which is provided from the negative electrode, and air (i.e., oxygen in the air) around the positive electrode. In addition, during charge of the lithium air battery, the produced metal oxide is reduced to a metal and oxygen. There remains a need for an improved lithium air battery material.

SUMMARY

Provided is a composite for a lithium air battery having improved capacity characteristics and a method of preparing the composite.

Provided is a lithium air battery employing a positive electrode that includes the composite.

Additional aspects will be set forth in part in the description which follows and, in part, will be apparent from the description.

According to an aspect, provided is a composite for a lithium air battery, wherein the composite is represented by Formula 1:

  Formula 1 wherein M in Formula 1 is at least one selected from a metallic element and a metalloid element, and 0<x<1.

According to another aspect, there is provided a method of preparing a composite represented by Formula 1 for a lithium air battery, the method including: polymerizing a composition including a polymeric monomer, a compound including a formyl group, a precursor including at least one selected from a metallic element and a metalloid element, and a solvent to form a polymeric intermediate; drying the polymeric intermediate at a temperature in a range of about 25° C. to about 100° C. to form a dried polymeric intermediate; and heat-treating the dried polymeric intermediate to prepare the composite.

According to another aspect, provided is a composite represented by Formula 1 and having a rectangular prism shape:

  Formula 1 wherein M in Formula 1 is at least one selected from a metal element and a metalloid element, and 0<x<1.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
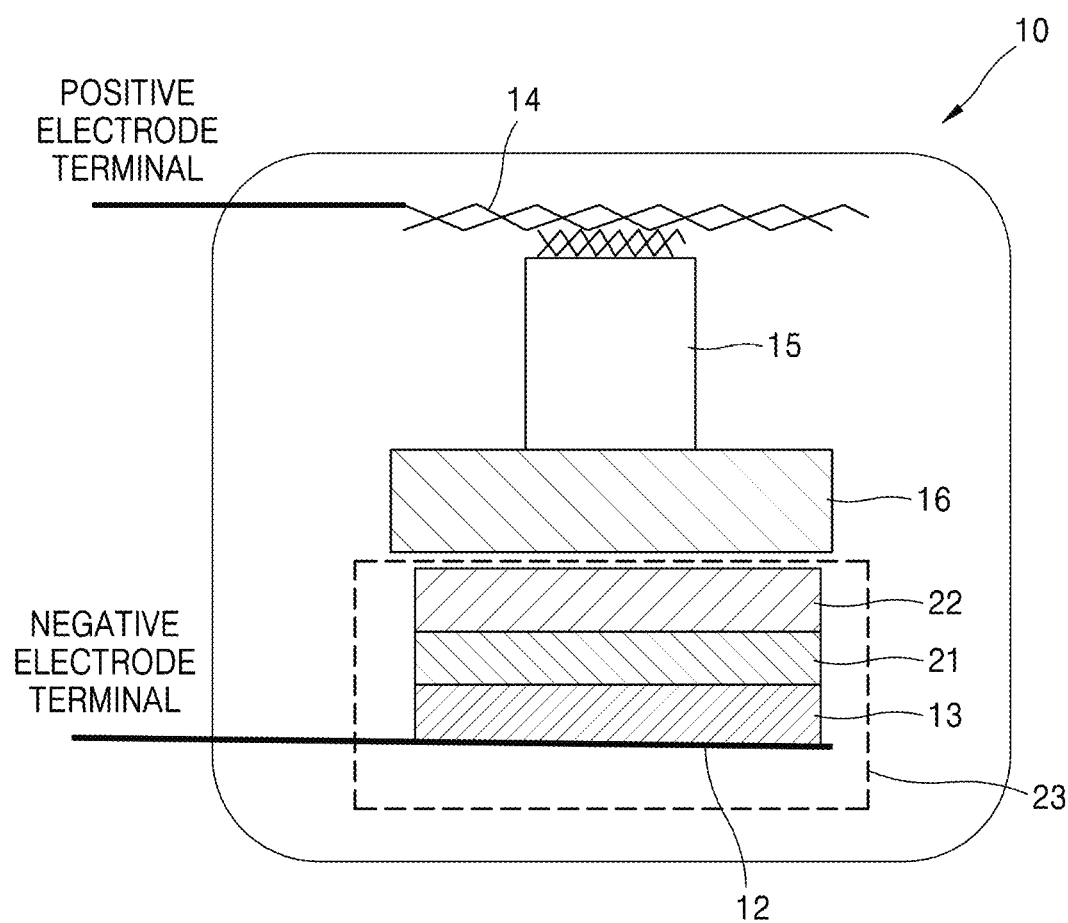
FIG. 1A is a schematic view of an embodiment of a lithium air battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Parallelogram" means a convex quadrilateral in which each pair of opposite edges are parallel and of equal length "Prism" means a polyhedron with parallel ends of a same size and shape, the other faces being parallelogram-shaped sides.

"Prismatic" means having a shape of a prism.

"Rectangular prism" means a prism having two rectangular bases and four lateral faces.

"Parallelepiped" means a six sided polyhedron in which all faces are similar parallelograms and opposite faces are parallel.

"Cuboid" means a parallelepiped in which each face is rectangular.

"Group" refers to a Group of the Periodic Table of the Elements.

"Rare earth" or "rare earth metal" means the fifteen lanthanide elements, i.e., atomic numbers 57 to 71, plus scandium and yttrium.

The "lanthanide elements" means the chemical elements with atomic numbers 57 to 71.

"Alkali metal" means a metal of Group 1 of the Periodic Table of the Elements, i.e., lithium, sodium, potassium, rubidium, cesium, and francium.

"Alkaline-earth metal" means a metal of Group 2 of the Periodic Table of the Elements, i.e., beryllium, magnesium, calcium, strontium, barium, and radium.

A composite for a lithium air battery, a method of preparing the composite, a positive electrode including the composite, and a lithium air battery including the positive electrode will be disclosed in further detail with regard to exemplary embodiments with reference to the attached drawings.

A composite represented by Formula 1 for a lithium air battery is provided:

$$MC_xN_{(1-x)} \quad \text{Formula 1}$$

wherein M in Formula 1 may be at least one selected from a metal element and a metalloid element, and $0<x<1$.

In Formula 1, M may be at least one selected from a Group 4 element, a Group 5 element, a Group 6 element, a Group 9 element, a Group 10 element, and a Group 14 element. In an embodiment, M is at least one selected from a Group 4 element and a Group 6 element. Use of a Group 4 element is specifically mentioned. In an embodiment, M is at least one selected from Ti, Mo, and W.

In Formula 1, x may be in a range of about 0.1 to about 0.9. For example, x may be in a range of about 0.3 to about 0.7, and for example, may be 0.3 or 0.5.

A titanium carbide (TiC) material in the related art is considered as a material that has high electrochemical stability, but it is too stable to react with oxygen, which is provided as a positive electrode active material in a positive electrode of a lithium air battery. Accordingly, due to the low activity of the TiC material, the positive electrode comprising TiC may have unsatisfactory capacity characteristics when TiC is used as a positive electrode material.

The composite of Formula 1 according to an embodiment may include carbon, nitrogen, and at least one selected from a metal element and a metalloid element. The composite of Formula 1 may comprise a crystalline structure via covalent bonds of these components, so that the composite of Formula 1 has increased reactivity to oxygen, as compared with the TiC material.

In Formula 1, M may be at least one selected from titanium (Ti), zirconium (Zr), hafnium (Hf), chromium (Cr), cobalt (Co), nickel (Ni), molybdenum (Mo), tungsten (W), cesium (Cs), palladium (Pd), platinum (Pt), germanium (Ge), rhodium (Rh), vanadium (V), niobium (Nb), tantalum (Ta), iridium (Ir), and silicon (Si).

When the composite of Formula 1 is included in a positive electrode, a lithium air battery employing a positive electrode that includes the composite of Formula 1 may provide improved cycle characteristics and the stability thereof. In addition, a positive electrode including the composite of Formula 1 and in the form of a nano-sized crystalline material, may have improved conductivity as compared with a non-crystalline material as a positive electrode material.

In some embodiments, the composite of Formula 1 may be a porous material, wherein an average pore diameter of the porous material is in a range of about 1 nanometer (nm) to about 200 nm, for example, about 1 nm to about 100 nm or about 1 nm to about 10 nm. Due to the inclusion of pores having an average pore diameter within these ranges, the composite of Formula 1 may further contain an electrolyte as compared with a case using a non-porous material.

A lithium air battery may have deteriorated performance if some of the electrolyte evaporates during the battery operation. However, when the composite of Formula 1 according to an embodiment is employed in a lithium air battery, the lithium air battery may contain more electrolyte due to the porosity of the composite as described above. In this regard, the inclusion of more electrolyte in the lithium air battery may prevent degradation in battery performance in advance and may also improve the conductivity of the lithium air battery.

In some embodiments, the composite may be in a form of a prismatic shape. The composite may be in a form of a right prism or a non-right prism, and may have a hexahedron shape, a regular prism shape, specifically a rectangular parallelepiped shape, or a cuboid shape, or a cube shape, or another hexahedron-like shape. A length of a side of the composite, which may be hexahedron-shaped, may be in a range of about 1 nm to about 1,000 nm, for example, about 2 nm to about 800 nm, about 4 nm to about 600 nm, or about 10 nm to about 100 nm.

The hexahedron shape includes a rectangular parallelepiped shape or a cube shape. In an embodiment, at least one corner and/or edge is rounded, and in an embodiment the each corner is rounded. A radius of each corner and/or edge may independently be about 0.1 nm to about 10 nm, about 0.5 nm to about 8 nm, or about 1 nm to about 5 nm.

When a positive electrode material formed in a prismatic shape is used to prepare a positive electrode, there may be an empty space between polygonal-shaped materials, and the empty space may impede lithium movement.

However, when the composite of Formula 1 having a prismatic shape is used, the volume of the empty space between particles of the composite may be reduced as compared with a case using a polygonal or spherical shaped material to prepare a positive electrode. In this regard, a positive electrode, having improved volumetric specific capacity characteristics and improved conductivity, may be obtained. In addition, the composite of Formula 1 may be in a form of an ordered prismatic shape, such as an ordered hexahedron shape. Thus, when the composite of Formula 1, which is in a form of an ordered prismatic shape, is used to prepare a positive electrode, the empty space between the particles of the composite may be reduced as compared to when a positive electrode material having an irregular shape is used. Accordingly, conductivity characteristics of the prepared positive electrode may be improved.

The composite of Formula 1 may comprise a crystalline nanostructure. Here, the M element, the C element, and the N element of Formula 1 may be distributed regularly, e.g., in regular periodic fashion, in the crystalline nanostructure. In addition, the composite of Formula 1 may comprise M-C, M-N, and C—N covalent bonds. The covalent bonds included in the composite of Formula 1 may be confirmed by a crystalline peak of MCN (e.g., TiCN) observed by X-ray diffraction (XRD).

As is further described above, the composite may have a prismatic structure, such as a cuboid structure, or a rectangular parallelepiped structure, or a cubic shape. Here, the composite may be a crystalline material having an average particle size in a range of about 10 nm to about 100 nm, for example, about 20 nm to about 50 nm, or about 25 nm to about 40 nm. The average particle size of the crystals of the composite may be observed by scanning electron microscopy (SEM) or XRD analysis. For example, XRD analysis may be used in the following matter to obtain an average particle size of the crystals.

In regard to XRD analysis using a Cu—Kα radiation, diffraction peaks appear at a diffraction angle (2θ) of a (200) plane in a range of about 42.2° to about 42.5°. Then, a particle size of the crystals may be obtained by a full width at half maximum (FMWH) of the diffraction peaks at the (200) plane. Here, an average particle size (La) of the crystals may be calculated based on the Scherrer equation represented by Equation 1:

$$La=(0.9\lambda)/(\beta \cos \theta) \qquad \text{Equation 1}$$

wherein in Equation 1, λ denotes an X-ray wavelength (about 1.54 Å) and β denotes an FWHM of a Bragg angle.

The composite may be, for example, formed in a cubic shape.

In some embodiments, a coating layer including a carbonaceous material may be disposed, e.g., formed, on a surface of the composite. In this case, when the composite and a carbonaceous material are mixed in the manufacturing of a positive electrode, the carbonaceous coating layer disposed on the surface of the composite may reduce the interface resistance between the composite and the carbonaceous material to be mixed, and accordingly, improve the corrosion resistance of a positive electrode, as compared with a case of not forming a coating layer on a surface of the composite.

The carbonaceous material may include, for example, at least one selected from amorphous carbon, crystalline carbon, graphene oxide, reduced graphene oxide, and carbon rods. For example, when the amorphous carbon is used as the carbonaceous material, the composite may have better corrosion resistance than when a crystalline carbonaceous material, such as crystalline carbon, graphene oxide, reduced graphene oxide, or carbon rods is used.

The crystalline carbon may comprise natural or artificial graphite, and may benon-shaped, plate, flake, spherical, or fiber type. The amorphous carbon may include soft carbon (e.g., low-temperature sintered carbon) or hard carbon, mesophase pitch carbonization products, sintered coke, graphene, carbon black, fullerene, carbon nanotubes, carbon fiber, or the like.

In some embodiments, the coating layer may be in a form of a continuous film shape or a discontinuous film shape, such as an island shape. A thickness of the coating layer may be, for example, in a range of about 1 nm to about 10 nm, for example, about 1 nm to about 5 nm. When the thickness of the coating layer is within these ranges, a positive electrode including the composite may have excellent corrosion resistance.

A mixing ratio of the composite to the carbonaceous material is not particularly limited. For example, the content of the composite may be in a range of about 0.01 parts to about 65 parts by weight, for example, about 20 parts to about 50 parts by weight, based on 100 parts by weight of a total weight of the composite and the carbonaceous material.

The carbonaceous material to be mixed with the composite may be identical to or different from the carbonaceous material included in the coating layer.

In some other embodiments, the composite may include at least one selected from $TiC_{0.1}N_{0.9}$, $TiC_{0.2}N_{0.8}$, $TiC_{0.3}N_{0.7}$, $TiC_{0.5}N_{0.5}$, $TiC_{0.7}N_{0.3}$, $TiC_{0.8}N_{0.2}$, $TiC_{0.9}N_{0.1}$, $WC_{0.1}N_{0.9}$, $WC_{0.2}N_{0.8}$, $WC_{0.3}N_{0.7}$, $WC_{0.5}N_{0.5}$, $WC_{0.7}N_{0.3}$, $WC_{0.8}N_{0.2}$, $WC_{0.9}N_{0.1}$, $MoC_{0.1}N_{0.9}$, $MoC_{0.2}N_{0.8}$, $MoC_{0.3}N_{0.7}$, $MoC_{0.5}N_{0.5}$, $MoC_{0.7}N_{0.3}$, $Mo_{0.8}N_{0.2}$, and $MoC_{0.9}N_{0.1}$.

The composite may have a structure consisting of at least one core unit, which is selected from $TiC_{0.1}N_{0.9}$, $TiC_{0.2}N_{0.8}$, $TiC_{0.3}N_{0.7}$, $TiC_{0.5}N_{0.5}$, $TiC_{0.7}N_{0.3}$, $TiC_{0.8}N_{0.2}$, and $TiC_{0.9}N_{0.1}$, and a coating layer, which includes an amorphous carbonaceous material, on a surface of the core unit.

In some embodiments, the composite of Formula 1 may further include at least one element selected from a Group 7 element, a Group 8 element, a Group 9 element, a Group 11 element, a Group 13 element, a rare earth metal, and an alkaline earth metal. When the composite of Formula 1 is used in a positive electrode, the capacity and charge and discharge cycle characteristics of the positive electrode may be further improved. Here, the at least one element selected from a Group 13 element, a rare earth metal, and an alkaline earth metal may refer to at least one selected from indium (In), copper (Cu), iron (Fe), cobalt (Co), manganese (Mn), yttrium (Y), lanthanum (La), samarium (Sm), calcium (Ca), barium (Ba), and magnesium (Mg).

In an embodiment, the composite of Formula 1 does not comprise oxygen.

When the composite of Formula 1 further includes oxygen, oxidation of the composite including oxygen can happen therein and accordingly, the lithium air battery performance of a lithium air battery employing the positive electrode including the composite may degrade. In addition, the lithium air battery may not appropriately exhibit benefits obtained by using the composite of Formula 1 containing carbon and nitrogen. The composite of Formula 1 may be a compound represented by Formula 2.

$$Ti_aM'_bC_xN_{(1-x)} \qquad \text{Formula 2}$$

wherein, M' in Formula 2 may be at least one selected from In, Cu, Fe, Co, Mn, Y, La, Sm, Ca, Ba, and Mg, and a, b, and x may each satisfy a relationship of $0.01 \le a < 1.0$, $0 < b \le 0.99$, $a+b=1$, and $0.1 \le x \le 0.9$.

Hereinafter, a method of preparing a composite, according to an embodiment, will be disclosed in further detail.

First, the method includes obtaining a polymeric intermediate by polymerizing composition, wherein the composition comprises a polymeric monomer, a compound containing a formyl group, a precursor including at least one selected from a metal element and a metalloid element, and a solvent.

The solvent used herein may include any suitable solvent. In an embodiment the solvent comprises at least one selected from ethanol, methanol, water, N-methylpyrrolidone, tetrahydrofuran, N,N-dimethylformamide, or dimethyl sulfoxide. The content of the solvent may be in a range of about 100 parts to 5,000 parts by weight, based on 100 parts by weight of the total weight of the precursor including at least one selected from a metal element and a metalloid element, the polymeric monomer, and the compound containing a formyl group. When the content of the solvent is within this range, individual components of the composition may be evenly mixed and/or dispersed so that the reactivity of the polymerization reaction may be suitable and accordingly, the polymeric intermediate may be obtained at an excellent yield.

The composite composition may be obtained by obtaining a precursor-containing mixture by mixing a first solvent with a precursor including, for example, at least one selected from a metal element and a metalloid element; and then adding the precursor-containing mixture to a mixture of the polymeric monomer, the compound containing a formyl group, and a second solvent.

Examples of the first and second solvents are ethanol, methanol, water, N-methylpyrrolidone, tetrahydrofuran, N,N-dimethylformamide, and dimethyl sulfoxide.

The content of the first solvent may be in a range of about 100 parts to about 3,000 parts by weight, based on 100 parts by weight of the precursor including at least one selected from a metal element and a metalloid element. The content of the second solvent may be in a range of about 100 parts to about 3,000 parts by weight, based on 100 parts by weight of the total weight of the polymeric monomer and the compound containing a formyl group. When a content of the first and second solvents are within these ranges, a mixture, in which the precursor is evenly dissolved, may be obtained.

The at least one selected from a metal element and a metalloid element may be at least one selected from a Group 4 element, a Group 5 element, a Group 6 element, a Group 9 element, a Group 10 element, and a Group 14 element.

The polymerization reaction of the composite composition may be performed, for example, at a temperature in a range of about 25° C. to about 100° C. Under this condition, the solvents contained in the composite composition may be refluxed. The content of the compound containing a formyl group in the composite composition may be in a range of about 1 mole to about 100 moles, for example, about 10 moles to about 20 moles, based on 1 mole of the polymeric monomer. When the content of the compound containing a formyl group is within these ranges, a desired polymeric intermediate may be obtained at an excellent yield.

The polymeric monomer may include, for example, at least one selected from melamine, urea, hydrogen cyanide, cyromazine, acetonitrile, acrylonitrile, resorcinol, phenol, fururyl alcohol, biphenyl, and sucrose. The compound containing a formyl group may include, for example, at least one selected from formaldehyde, formic acid, formamide, and paraformaldehyde.

In the case of the polymeric monomer including at least one selected from hydrogen cyanide, cyromazine, resorcinol, phenol, fururyl alcohol, biphenyl, and sucrose, the composite composition may further include a nitrogen precursor. Here, the nitrogen precursor may include, for example, melamine, urea, hydrogen cyanide, cyromazine, acetonitrile, or acrylonitrile.

The content of the nitrogen precursor may be selected so as to obtain the composite of Formula 1.

Times for the polymerization reaction may vary according to ranges of temperature at which a heat treatment is performed. For example, the polymerization reaction may be performed at a temperature in a range of about 25° C. to about 100° C. for at least 1 hour, for example, for 1 to 10 hours.

In some embodiments, the precursor including at least one element selected from a Group 4 element, a Group 5 element, a Group 6 element, a Group 9 element, a Group 10 element, rare earth elements, and a Group 14 element in the composite composition may be at least one selected from a hydroxide, nitrate, sulfate, and an acetate. In an embodiment, the precursor comprises at least one selected from Ti, Hf, Cr, Co, Ni, Mo, W, Ce, Ni, Pd, Pt, Sn, V, Nb, Ta, and Si.

The precursor may include, for example, at least one selected from titanium hydroxide, titanium nitrate, titanium sulfate, titanium acetate, molybdenum hydroxide, molybdenum nitrate, molybdenum sulfate, molybdenum acetate, tungsten hydroxide, tungsten nitrate, tungsten sulfate, and tungsten acetate.

In some other embodiments, the composite composition may further include a precursor including at least one selected from a Group 13 element, a rare earth metal, and an alkaline earth metal. The content of the precursor may be selected to provide a stoichiometry so as to obtain the composition of Formula 2.

Next, the polymeric intermediate is dried. Here, the drying of the polymeric intermediate may be performed at a temperature, for example, in a range of about 25° C. to about 200° C., or about 50° C. to about 150° C. Times for the drying may vary according ranges of temperature at which the drying is performed. For example, the drying may be performed for at least 1 hour, for example, for about 1 to about 48 hours.

The dried polymeric intermediate is then subjected to heat treatment for carbonization, so as to obtain the composite of Formula 1.

The heat treatment may be performed at a temperature in a range of about 400° C. to about 1,400° C., about 450° C. to about 1,300° C., or about 500° C. to about 1,200° C. under an inert gas atmosphere.

The inert gas atmosphere may be at least one inert gas selected from argon, nitrogen, and helium. The heat treatment may be performed at a temperature, for example, in a range of about 900° C. to about 1,200° C. At these temperatures, the coating layer including the carbonaceous material may be evenly formed on a surface of the composite.

The temperature at which the heat treatment is performed may influence a mixing ratio of carbon to nitrogen in a finally obtained product. Since carbon has a relatively slower diffusion speed than nitrogen, increased temperatures at which the heat treatment is performed provide increased carbon content in the composition, and increased carbon content can be preferred. Thus, temperature at which the heat treatment is performed may be preferred to be in a range of about 900° C. to about 1,400° C., for example, about 1,100° C. to about 1,200° C. to provide increased carbon content.

Times for the heat treatment may vary according to temperatures at which the heat treatment is performed. For example, the time for the heat treatment may be in a range of about 1 hour to about 48 hours.

According to another aspect, there is provided a lithium air battery employing a positive electrode including the composite.

The positive electrode may include the composite according to an embodiment.

The positive electrode may be manufactured in the following manner. The composite, a solvent, and a binder may be mixed together to prepare a positive electrode composition. Then, a current collector may be coated with the positive electrode composition to manufacture a positive electrode.

In the manufacturing of the positive electrode, the positive electrode composition may be further dried after being coated on the current collector.

The binder may include a thermoplastic resin or thermosetting resin. Examples of the binder include polyethylene, polypropylene, polytetrafluoroethylene (PTFE), polyvinylidene fluoride (PVdF), styrene butadiene rubber, a tetrafluoroethylene-perfluoro (alkyl vinyl ether) copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and ethylene-acrylic acid copolymer, which may be used alone or in a combination thereof. The examples of the binder are not limited thereto, and any suitable material available as a binder in the art may be used.

The current collector may have, in order to rapidly diffuse oxygen, a porous body, such as a netlike structure or a mesh-shaped body. For example, the current collector may be a porous metal plate formed of stainless steel, nickel, or aluminum, but is not limited thereto. Any suitable material available as a current collector in the art may be used. In order to prevent oxidation, the current collector may be coated with an oxidation-resistant metal or an alloy film.

The positive composition may further include an oxygen oxidation/reduction catalyst. Such catalysts are commercially available. For example, the oxygen oxidation/reduction catalyst may include at least one selected from a metal particle, a metal oxide particle, and an organic metal compound. Such catalysts are commercially available and can be selected by one of skill in the art without undue experimentation.

The metal particle may include at least one selected from Co, Ni, Fe, aluminum (Au), silver (Ag), platinum (Pt), ruthenium (Ru), rhodium (Rh), osmium (Os), iridium (Ir), Pd, and alloys thereof. The metal oxide particle may include at least one selected from manganese oxide, cobalt oxide, iron oxide, zinc oxide, nickel oxide, strontium oxide, lanthanum oxide, barium oxide, lithium oxide, titanium oxide, potassium oxide, magnesium oxide, calcium oxide, yttrium oxide, niobium oxide, zirconium oxide, copper oxide, chromium oxide, molybdenum oxide, a perovskite-type crystalline metal oxide of the formula AB"$O_3$ formulation, such as (Sm,Sr)$CoO_3$, (La,Sr)$MnO_3$, (La,Sr)$CoO_3$, (La,Sr)(Fe,Co)$O_3$, (La,Sr)(Fe,Co,Ni)$O_3$, $La_{0.8}Sr_{0.2}MnO_3$(LSM), and $La_{0.8}Sr_{0.4}Co_{0.8}Fe_{0.2}O_3$(LSCF), and a composite oxide thereof. The organic metal compound may include an aromatic heterocyclic compound coordinated to a transition metal. However, the catalyst is not limited thereto, and any suitable material available as an oxidation/reduction catalyst in the art may be used. For example, the oxidation/reduction catalyst may include tungsten carbide (WC), WC—Co, $CoWO_4$, $FeWO_4$, NiS, $WS_2$, $La_2O$, $Ag_2O$, or cobalt phthalocyanine. In addition, the oxidation/reduction catalyst may be impregnated with a support. The support may include a porous carbonaceous material or carbon. Examples of the carbon are carbon black, such as ketjen black, acetylene black, or lamp black, graphite, such as natural graphite, artificial graphite, expanded graphite, active carbon, and carbon fibers, but are not limited thereto. Any suitable material available as a support in the art may be used.

Examples of the solvent included in the positive electrode composition are N-methylpyrrolidone, ethanol, methanol, tetrahydrofuran, and N,N-dimethylformamide. Here, the content of the solvent may be in a range of about 100 parts to about 5,000 parts by weight, based on 100 parts by weight of the composite.

The positive electrode composition may further contain a carbonaceous material.

In some embodiments, the lithium air battery may include the positive electrode. Such a lithium air battery includes a negative electrode and an electrolyte disposed between the negative electrode and the positive electrode.

In the first discharge cycle under the conditions of dry air (having a dew point of −80° C. or less) at 60° C. and a pressure of 1 atmosphere, the lithium air battery is discharged at a constant current of 0.24 mA/cm² within a voltage window range of about 2.0 Volts (V) to about 4.2 V versus lithium metal, wherein the discharge capacity per unit weight of the positive electrode is in a range of about 100 mAh/$g_{(compsite+binder)}$ to about 1,500 mAh/$g_{(compsite+binder)}$ or greater, based on a total weight of the composite and the binder. For example, in the case of additionally using carbonaceous material in the manufacturing of the positive electrode, the discharge capacity per unit weight of the positive electrode is in a range of about 300 MAh/$g_{(compsite+binder)}$ to about 1,500 mAh/$g_{(composite+binder)}$ or greater, based on a total weight of the composite and the binder.

A negative electrode capable of intercalating and deintercalating lithium ions may include Li metal, a Li metal-based alloy, or a material capable of intercalating and deintercalating lithium ions, but is not limited thereto. Any suitable material available as a negative electrode or any suitable material including lithium or capable of intercalating and deintercalating Li in the art may be used. In consideration of the negative electrode, which can effectively determine the capacity of the lithium air battery, the negative electrode may be, for example, lithium metal. The lithium metal-based alloy may consist of lithium and Al, Sn, Mg, In, Ca, Ti, or V.

The electrolyte may be an organic-based electrolyte or an aqueous electrolyte.

The organic-based electrolyte may include an aprotic solvent, and the aprotic solvent may be a carbonate-based solvent, an ester-based solvent, an ether-based solvent, a ketone-based solvent, or an alcohol-based solvent. Examples of the carbonate-based solvent are dimethyl carbonate (DMC), diethyl carbonate (DEC), ethylmethyl carbonate (EMC), dipropyl carbonate (DPC), methylpropyl carbonate (MPC), ethylpropyl carbonate (EPC), ethylene carbonate (EC), propylene carbonate (PC), and butylene carbonate (BC). Also, the organic-based electrolyte may include tetraethylene glycol dimethyl ether (TEGDME), and polyethylene glycol dimethyl ether (PEGDME).

Examples of the ester-based solvent are methyl acetate, ethyl acetate, n-propyl acetate, t-butylacetate, methylpropionate, ethyl propionate, γ-butyrolactone, decanolide, valerolactone, mevalonolactone, and caprolactone. Examples of the ether-based solvent are dibutylether, tetraglyme, diglyme, dimethoxyethane, 2-methyltetrahydrofuran, and tetrahydrofuran. An example of the ketone-based solvent is cyclohexanone. In addition, examples of the alcohol-based solvent are ethyl alcohol and isopropyl alcohol. The aprotic solvent is not limited to the examples above, and any suitable material available as an aprotic solvent in the art may be used.

In addition, the aprotic solvent may include nitriles such as a compound of the formula R—CN (wherein, R is a C2 to C30 linear, branched, or cyclic hydrocarbon group, and may include a double bond, an aromatic ring, or an ether bond), amides such as dimethylformamide, a dioxolane such as 1,3-dioxolane, and a sulfolane.

The aprotic solvent may be used alone or in a combination thereof. In the case of the aprotic solvent being used in a combination, a ratio of the one or more aprotic solvents may be used, and the content of the combination may be determined by one of skill in the art without undue experimentation.

In addition, the organic-based electrolyte may include an ionic liquid, and the ionic liquid may include a cation, such as a substituted linear or branched ammonium, imidazolium, pyrrolidinium, or piperidinium, and an anion, such as $PF_6^-$, $BF_4^-$, $CF_3SO_3^-$, $(CF_3SO_2)_2N^-$, $(C_2F_5SO_2)_2N^-$, $(FSO_2)_2N^-$, or $(CN)_2N^-$.

The organic-based electrolyte may include an alkali metal salt and/or an alkaline earth metal salt. The alkali metal salt and/or the alkaline earth metal salt may be dissolved in an organic solvent so as to act as a source of an alkali metal ion and/or an alkaline earth metal ion within a battery. For example, the organic-based electrolyte may catalyze the movement of the alkali metal ion and/or the alkaline earth metal ion between the positive electrode and the negative electrode.

For example, the cation of the alkali metal salt and/or the alkaline earth metal salt may comprise at least one selected from a lithium ion, sodium ion, magnesium ion, potassium ion, calcium ion, rubidium ion, strontium ion, cesium ion, and a barium ion.

The anion of these salts contained in the organic-based electrolyte may be at least one selected from $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (wherein x is a natural number of 1 to 100), $(C_xF_{2x+1}SO_2)(C_yF_{2y+1}SO_2)N^-$ (wherein x and y are natural numbers of 1 to 100), and a halide.

For example, the alkali metal salt and/or the alkaline earth metal salt may be at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(CxF_{2x+1}SO_2)(CyF_{2y+1}SO_2)$ (wherein x and y are natural numbers of 1 to 100), LiF, LiBr, LiCl, Lit, and $LiB(C_2O_4)_2$(lithium bis (oxalato) borate:LiBOB), but are not limited thereto. Any suitable material available as an alkali metal salt and/or an alkaline earth metal salt in the art may be used.

The content of the alkali metal salt and/or the alkaline earth metal salt in the organic-based electrolyte may be in a range of about 50 millimolar (mM) to about 10 molar (M), for example, about 100 mM to about 2 M. However, the content of the alkali metal salt and/or the alkaline earth metal salt is not particularly limited thereto as long as the organic-based electrolyte is capable of effectively transferring lithium ions during the charge and discharge of the lithium air battery.

The separator is not particularly limited in terms of a formulation as long as the formulation is suitably durable within ranges of the lithium air battery use. The separator may be, for example, a polymeric non-woven fabric comprising polypropylene or polyphenylene sulfide, or a porous film comprising an olefin-based resin such as polyethylene or polypropylene, and these examples may be used in combination.

In addition, a Li ion conductive solid electrolyte membrane may be additionally disposed between the negative electrode and the organic-based electrolyte. The Li ion conductive solid electrolyte membrane may act as a protective layer to prevent a direct reaction between lithium in the negative electrode and impurities, such as water and oxygen, contained in the organic-basedelectrolyte. The Li ion conductive solid electrolyte membrane may be, for example, a Li ion conductive glass, a Li ion conductive crystal (ceramic or glass-ceramic), or an inorganic material containing a mixture thereof. However, the Li ion conductive solid electrolyte membrane is not particularly limited thereto, and any suitable material having Li ion conductivity and being capable of protecting the negative electrode may be used. For example, the Li ion conductive crystal may comprise $Li_{1+x+y}(Al, Ga)_x(Ti, Ge)_{2-x}Si_yP_{3-y}O_{12}$ (wherein $0 \leq x \leq 1$ and $0 \leq y \leq 1$, for example, $0 \leq x \leq 0.4$ and $0 < y \leq 0.6$, for example, $0.1 \leq x \leq 0.3$ and $0.1 < y \leq 0.4$). Examples of the Li ion conductive glass-ceramic are a lithium-aluminum-germanium-phosphate (LAGP), a lithium-aluminum-titanium-phosphate (LATP), and a lithium-aluminum-titanium-silicon-phosphate (LATSP).

In some embodiments, the Li ion conductive solid electrolyte membrane may further include a polymeric solid electrolyte in addition to the glass-ceramic. The polymeric solid electrolyte may comprise a polyethylene oxide doped with a lithium salt, and examples of the lithium salt are $LiN(SO_2F)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

In some other embodiments, the Li ion conductive solid electrolyte membrane may further include an inorganic solid electrolyte in addition the glass-ceramic. Examples of the inorganic solid electrolyte are $Cu_3N$, $Li_3N$, and LiPON.

The lithium air battery according to an embodiment may be manufactured as follows.

First, a positive electrode including the composite described above, a negative electrode capable of intercalating and deintercalating lithium ions, and a separator are prepared.

Next, the negative electrode is mounted on one side of a battery case, and the positive electrode with the separator is mounted on the other side of the battery case, opposite to the negative electrode. The separator is disposed on the side of the positive electrode, facing the negative electrode. An electrolyte is disposed, e.g., injected, between the positive electrode and the negative electrode, a porous current collector is disposed on the positive electrode, and a pressing member that allows air to reach the positive electrode applies pressure to fix a cell, thereby completing the manufacture of the lithium air battery. Here, a Li ion conductive solid electrolyte membrane may be further disposed on a surface of the negative electrode.

The battery case may be divided into upper and lower parts that contact the negative and positive electrodes, respectively. An insulating resin may be disposed between the upper and lower parts to electrically insulate the positive and negative electrodes from each other.

The lithium air battery may be either a lithium primary battery or a lithium secondary battery. The lithium air battery may be in various shapes, and in some embodiments, may have a coin, button, sheet, stack, cylinder, plane, or horn shape. The lithium air battery may be as a battery for an electric vehicle.

FIG. 1A is a schematic view of an embodiment of a lithium air battery 10.

The lithium air battery 10 includes a positive electrode 15, which is configured to use oxygen as an active material and which is disposed adjacent to a first current collector 14, a negative electrode 13 including lithium and disposed adjacent to a second current collector 12, an organic-based electrolyte (not illustrated) disposed between the positive electrode 15 and the negative electrode 13, and a separator 16 disposed on one surface of the positive electrode 15. Another separator 21, which is impregnated in the organic-based electrolyte and a Li ion conductive solid electrolyte membrane 22 may be sequentially disposed on one surface of the negative electrode 13. The negative electrode 13, the separator 21, and the solid electrolyte membrane 22 may be contained in a pouch 23, and the pouch 23 may contact the separator 16 through a hole formed on the top of the pouch 23. The first current collector 14, which is porous, may serve as a gas diffusion layer (GDL) that allows air diffusion. Also, a pressing member (not illustrated) that allows air to reach the positive electrode 15 may be disposed on the first current collector 14. A battery case (not illustrated) made of an insulating resin material may be disposed between the positive electrode 15 and the negative electrode 13 so as to electrically separate the positive electrode 15 and the negative electrode 13 from each other. The lithium air battery may be housed in a stainless steel container if desired.

As used herein, the term "air" is not limited to atmospheric air, and may refer to any suitable combination of gases including oxygen, or pure oxygen gas. The broad definition of "air" also applies to other terms including "air battery" and "air electrode".

According to another aspect, there is provided a composite represented by Formula 1 below and having prismatic shaped structure, e.g., a hexahedron-shaped structure, or a similar shape thereof, such as a hexahedron-like shape:

$$MC_xN_{(1-x)} \quad \text{Formula 1}$$

wherein M in Formula 1 may be at least one selected from a Group 4 element, a Group 6 element, a Group 9 element, a Group 10 element, and a Group 14 element, and $0<x<1$.

An average particle size of the composite may be in a range of about 10 nm to about 100 nm, for example, about 20 nm to about 50 nm.

The composite according to an embodiment may have a prismatic shaped structure, e.g., a hexahedron-shaped structure, or a similar shape thereof, for example, an ordered hexahedron-shaped structure or a similar shape thereof. The composite may be in a form of a right prism or a non-right prism, and may have a hexahedron shape, a regular prism shape, specifically a rectangular parallelepiped shape, or a cuboid shape, or a cube shape, or another hexahedron-like shape. In this regard, the positive electrode including the composite may have improved corrosion resistance and conductivity as compared to when a composite having a different shaped structure is used. In addition, a battery having improved capacity and cycle characteristics may be manufactured.

As used herein, the term "a similar shape of the hexahedron shape" or "the hexahedron-like shape" may refer to a hexahedron shape of which each corner is rounded. In an embodiment, a radius of a corner and/or edge may be about 0.1 nm to about 10 nm, about 0.5 nm to about 8 nm, or about 1 nm to about 5 nm.

A cross-sectional area of the composite according to an embodiment may be in a range of about 10 nm² to about 70 nm², for example, about 10 nm² to about 60 nm².

The composite may be used as an electrode material for a lithium battery.

For example, the composite may be used as a positive electrode material. The lithium battery may be, for example, a lithium ion battery, a lithium ion polymer battery, or the like.

In some embodiments, the lithium battery may include a positive electrode including the composite, a negative electrode, and a separator that is disposed between the positive electrode and the negative electrode.

In some embodiments, the positive electrode may use a positive electrode active material for a lithium battery, in addition to the composite described above.

The positive electrode active material may include at least one selected from lithium cobalt oxide, lithium nickel cobalt manganese oxide, lithium nickel cobalt aluminum oxide, lithium iron phosphate, and lithium manganese oxide, but is not limited thereto. Any suitable material available as a positive electrode material in the art may be used.

For example, the positive electrode material may be a compound represented by any one of formulae $Li_aA_{1-b}B'_bD'_2$ (wherein $0.90 \leq a \leq 1.8$ and $0 \leq b \leq 0.5$); $Li_aE_{1-b}b'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$ and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0<\alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0<\alpha<2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0<\alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0<\alpha<2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3 (0 \leq f \leq 2)$; $Li_{(0-f)}Fe_2(PO_4)_3 (0 \leq f \leq 2)$; and $LiFePO_4$.

In Formula 1, A may be Ni, Co, Mn, or a combination thereof; B' may be Al, Ni, Co, Mn, Cr, Fe, Mg, Sr, V, a rare earth element, or a combination thereof; D' may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof.

A positive electrode active material, a binder, and a solvent may be mixed so as to prepare a positive electrode active material composition, and a conductive agent may be further added to the positive electrode active material composition.

The positive electrode active material composition may be directly coated and dried on a metal current collector so as to manufacture a positive electrode. Alternatively, the positive electrode active material composition may be cast on a separate support to form a positive electrode active material film, and then, the positive electrode active material film may be separated from the support and laminated on a metal current collector so as to manufacture a positive electrode plate.

Examples of the conductive agent are carbon black, graphite particle, natural or artificial graphite, acetylene black, ketjen black, carbon fibers; carbon nanotubes, metal powder including copper, nickel, aluminum, and silver, metal fiber, or metal tube; and a conductive polymer such a polyphenylene derivative, but are not limited thereto. Any suitable material available as a conductive agent in the art may be used.

Examples of the binder are a vinylidene fluoride/hexafluoropropylene copolymer, polyvinylidene fluoride, polyimide, polyethylene, polyester, polyacrylonitrile, polymethylmethacrylate, polytetrafluoroethylene (PTFE), a carboxymethyl cellulose-styrene-butadiene rubber (SMC/SBR) copolymer, styrene-butadiene rubber polymer, and a combination thereof.

The solvent may use N-methyl pyrrolidone, acetone, or water, but is not limited thereto. Any suitable material available as a solvent in the art may be used.

The contents of the positive electrode active material, the conductive agent, the binder, and the solvent may be determined by one of ordinary skill in the art without undue experimentation. Depending on a configuration and usage of the lithium battery, at least one of the conducting agents, the binder, and the solvent may be omitted.

The negative electrode may be prepared in the same manner as in the preparation of the positive electrode, except that a negative electrode active material is used instead of the positive electrode active material.

The negative electrode active material for the lithium battery may be a carbonaceous material, silicon, silicon oxide, a silicon-based alloy, a silicon-carbonaceous material composite, tin, a tin-based alloy, a tin-carbon composite, metal oxide, or a combination thereof.

The carbonaceous material may be crystalline carbon, amorphous carbon, or a combination thereof. Examples of the crystalline carbon and the amorphous carbon are defined the same as in the composite.

The negative electrode active material may be selected from Si, SiOx (wherein 0<x<2, for example, x is in a range of 0.5 to 1.5), Sn, $SnO_2$, a silicon-containing metal alloy, and a combination thereof. The metal capable of forming the silicon alloy may be at least one selected from aluminum (Al), tin (Sn), silver (Ag), iron (Fe), bismuth (Bi), magnesium (Mg), zinc (Zn), indium (In), germanium (Ge), lead (Pb), and titanium (Ti).

The negative active material may include a metal/metalloid capable of being alloyed with lithium, an alloy thereof, or an oxide thereof. The metal/metalloid capable of being alloyed with lithium may be, for example, Si, Sn, Al, Ge, Pb, Bi, Sb, a Si—Y' alloy (wherein Y' may be an alkali metal, an alkaline earth metal, a Group 13 element, a Group 14 element, a transition metal, a rare earth element or a combination thereof, but may not be Si), a Sn—Y" alloy (wherein Y" may be an alkali metal, an alkaline earth metal, a Group 13 to 16 element, a transition metal, a rare earth element, or a combination thereof, but may not be Sn), or SnOx (0<x≤2).

The element Y' and Y" may each independently be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. The oxide of the metal/metalloid capable of being alloyed with lithium may be, for example, a lithium titanium oxide, a vanadium oxide, a lithium vanadium oxide, $SnO_2$, or $SiO_x$ (0<x<2).

The contents of the negative active material, the conductive agent, the binder, and the solvent may be determined by one of ordinary skill in the art without undue experimentation. In addition, the conductive agent and binder may be used in the same manner as those used in the positive electrode.

The separator may be disposed between the positive electrode and the negative electrode and may be an insulating thin film having high ion permeability and mechanical strength.

The separator may have a pore diameter in a range of about 0.01 micrometer (μm) to about 10 μm and a thickness in a range of about 5 μm to about 20 μm. The separator may be, for example, an olefin-based polymer such as polypropylene; or a sheet or a non-woven fabric made of glass fiber or polyethylene. In the case of using a solid polymer electrolyte as an electrolyte for a lithium battery, the solid polymer electrolyte may function as both an electrolyte and a separator.

Examples of the olefin-based polymer as the separator are polyethylene, polypropylene, polyvinylidene fluoride, or multi-layers thereof, such as a polyethylene/polypropylene double-layered separator, a polyethylene/polypropylene/ polyethylene triple-layered separator, and a polypropylene/ polyethylene/polypropylene triple-layered separator.

The nonaqueous electrolyte containing the lithium salt may consist of a nonaqueous electrolyte and a lithium salt.

The nonaqueous electrolyte may be a nonaqueous electrolytic solution, an organic solid electrolyte, or an inorganic solid electrolyte.

The nonaqueous electrolyte solution may include an organic solvent, and any suitable material available as an organic solvent in the art may be used. For example, the organic solvent may include at least one selected from a propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, N,N-dimethylformamide, N,N-di methylacetamide, dimethylsulfoxide, dioxane, 1,2-dimethoxyethane, sulfolane, dichloroethane, chlorobenzene, nitrobenzene, diethylene glycol, and dimethyl ether.

The organic solid electrolyte may include, for example, a polyethylene derivative, a polyethylene oxide derivative, a polypropylene oxide derivative, a phosphate ester polymer, polyester sulfide, polyvinyl alcohol, polyvinylidene fluoride, or a polymer containing an ionic dissociation group.

The inorganic solid electrolyte may include $Li_3N$, LiI, $Li_5NI_2$, $Li_3N$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt is a material that is readily soluble in the nonaqueous electrolyte, and examples thereof are at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, and LiI. In addition, in consideration of improvement in charge and discharge characteristics and flame retardancy, the nonaqueous electrolyte may further include at least one selected from pyridine, triethyl phosphate, triethanolamine, cyclic ether, ethylenediamine, n-glyme, hexamethyl phosphoramide, a nitrobenzene derivative, sulfur, a quinonimin-dye, N-substituted oxazolidinone, N, N-substituted imidazolidine, ethylene glycol dialkyl ether, ammonium, pyrrole, 2-methoxyethanol, and trichloroaluminum. In some embodiments, in consideration of incombustibility, the nonaqueous electrolyte may further include a halogen-containing solvent, such as carbon tetrachloride or trifluoroethylene.

Figure 1B:
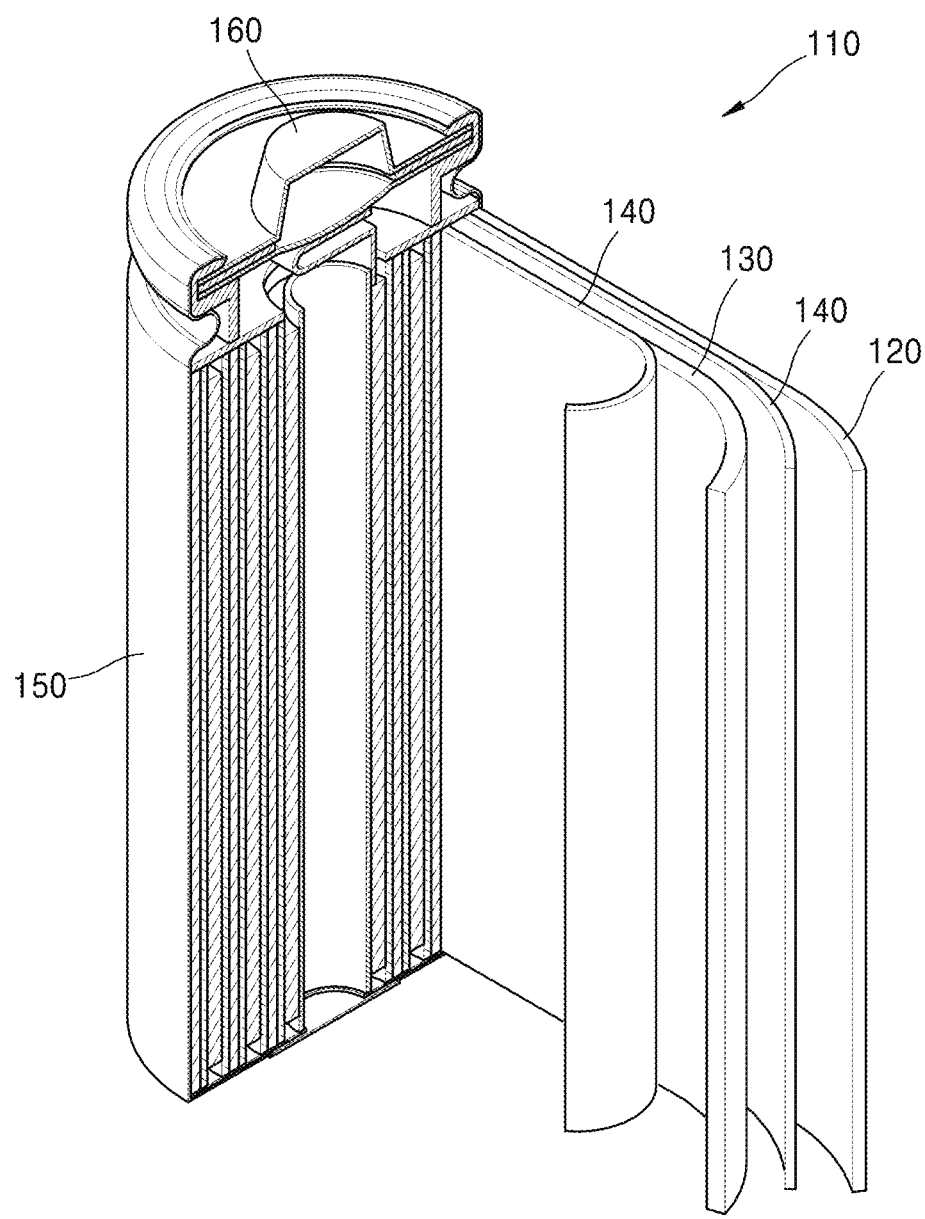
FIG. 1B is an exploded perspective view of an embodiment of a lithium battery.

FIG. 1B is a schematic view of an embodiment of a lithium battery 110.

As illustrated in FIG. 1B, the lithium battery 110 includes a positive electrode 130, a negative electrode 120, and a separator 140. The positive electrode 130, the negative electrode 120, and the separator 140 are wound or folded to be housed in a battery case 150. Then, an organic electrolytic solution is injected into the battery case 150, and the resulting structure is sealed with a cap assembly 160, thereby completing the manufacture of the lithium battery 110. The battery case 150 may be a cylindrical type, a rectangular parallelepiped type, or a thin-film type. For example, the lithium battery may be a thin-film type battery. The lithium battery 110 may be a lithium ion battery.

A battery assembly may be formed by disposing the separator between the positive electrode and the negative electrode. A plurality of the battery assemblies may be stacked in a bi-cell structure and then impregnated with an organic electrolytic solution. The resulting structure is housed in a pouch and sealed, thereby completing the manufacturing of a lithium ion polymer battery.

In addition, several of the above battery assemblies may be stacked on top of one another to form a battery pack, and the battery pack may be used in high-capacity and high-power output devices, such as a battery pack may be used in a laptop, a smart phone, an electric vehicle, or the like.

The lithium battery according to an embodiment has excellent high-rate characteristics and a long lifespan, and in this regard, the lithium battery may be suitable for an electric vehicle (EV). For example, the lithium battery may be used in a hybrid electric vehicle, such as plug-in hybrid electric vehicle (PHEV).

Hereinafter, examples of the present invention will be described in detail. The examples are for illustrative purposes only and shall not limit the scope of the present disclosure.

EXAMPLES

Preparation Example 1

5 mmol of titanium isopropoxide was mixed with 50 mL of ethanol to prepare a titanium precursor solution.

Separately from the preparation of the titanium precursor solution, 1.5 mmol of melamine and 17.2 mmol of formaldehyde were mixed in 50 mL of water to prepare a mixture thereof.

The titanium precursor solution and the mixture were mixed together, and the mixed solution was refluxed at a temperature of 85° C. for 48 hours to carry out a polymerization reaction.

The polymerization product was vacuum-filtered and then dried at a temperature of 80° C. to obtain a polymeric intermediate.

The polymeric intermediate was heat-treated at a temperature of about 1,100° C. under an argon gas atmosphere to prepare a $TiC_{0.3}N_{0.7}$ composite. The $TiC_{0.3}N_{o7}$ composite had a structure in which a coating layer containing an amorphous carbonaceous material is formed on a surface of the composite. The thickness of the coating layer was about 4 nm.

Preparation Example 2

A $TiC_{0.5}N_{0.5}$ composite was prepared in the same manner as in Preparation Example 1, except that the temperature at which the heat treatment was performed was changed from 1,100° C. to 1,200° C. The $TiC_{0.5}N_{0.5}$ composite had a structure in which a coating layer containing an amorphous carbonaceous material is formed on a surface of the composite. Here, the thickness of the coating layer was about 4 nm.

Preparation Example 3

The $TiC_{0.3}N_{0.7}$ composite of Preparation Example 1 and carbon black (Printex from Degussa) were mixed together at a weight ratio of 20:80 to prepare a composite material.

Preparation Example 4

The $TiC_{0.3}N_{0.7}$ composite of Preparation Example 1 and carbon black were mixed together at a weight ratio of 50:50 to prepare a composite material.

Preparation Example 5

The $TiC_{0.3}N_{0.7}$ composite of Preparation Example 1 and carbon black were mixed together at a weight ratio of 70:30 to prepare a composite material.

Preparation Example 6

A $TiC_{0.5}N_{0.5}$ composite was prepared in the same manner as in Preparation Example 1, except that the temperature at which the heat treatment was performed was changed from 1,100° C. to 1,000° C. The $TiC_{0.5}N_{0.5}$ composite had a structure in which a coating layer containing an amorphous carbonaceous material is not formed on a surface of the composite.

Preparation Example 7

A $WC_{0.3}N_{0.7}$ composite was prepared in the same manner as in Preparation Example 1, except that tungsten isopropoxide was used instead of titanium isopropoxide. The $WC_{0.3}N_{0.7}$ composite had a structure in which a coating layer containing an amorphous carbonaceous material is formed on a surface of the composite, and the thickness of the coating layer was about 4 nm.

Comparative Preparation Example 1

Titanium carbide (TiC) (Sigma-Aldrich, Titanium carbide nanopowder, 95%) was used.

Comparative Preparation Example 2

Titanium nitride (TiN) (Sigma-Aldrich, Titanium nitride nanopowder, 97%) was used.

Comparative Preparation Example 3

Carbon black (Printex from Degussa) was used.

Comparative Preparation Example 4

TiC of Comparative Preparation Example 1 and carbon black (Printex from Degussa) were mixed together at a weight ratio of 2:8 to prepare a mixed material.

Comparative Preparation Example 5

TiN of Comparative Preparation Example 2 and carbon black (Printex from Degussa) were mixed together at a weight ratio of 2:8 to prepare a mixed material.

Comparative Preparation Example 6

TiC of Comparative Preparation Example 1 and TiN of Comparative Preparation Example 2 were mixed together at a weight ratio of 1:2 to prepare a mixed material.

Comparative Preparation Example 7

TiC of Comparative Preparation Example 1, TiN of Comparative Preparation Example 2, and carbon black (Printex from Degussa) of Comparative Preparation Example 3 were mixed together at a weight ratio of 1:2:7.

The composites of Preparation Examples 1, 2, and 6-7, the composite materials of Preparation Examples 3-5, and the materials of Comparative Preparation Examples 1-7 are summarized as shown in Table 1 below.

TABLE 1

| Example | Composition | Presence of a coating layer made of a carbonaceous material on the composite surface |
|---|---|---|
| Preparation Example 1 | $TiC_{0.3}N_{0.7}$ | Present |
| Preparation Example 2 | $TiC_{0.5}N_{0.5}$ | Present |
| Preparation Example 3 | $TiC_{0.3}N_{0.7}$ + carbon black (at a weight ratio of 20:80) | Present |
| Preparation Example 4 | $TiC_{0.3}N_{0.7}$ + carbon black (at a weight ratio of 50:50) | Present |
| Preparation Example 5 | $TiC_{0.3}N_{0.7}$ + carbon black (at a weight ratio of 70:30) | Present |
| Preparation Example 6 | $TiC_{0.3}N_{0.7}$ | Not Present |
| Preparation Example 7 | $WC_{0.3}N_{0.7}$ | Present |
| Comparative Preparation Example 1 | TiC | — |
| Comparative Preparation Example 2 | TiN | — |
| Comparative Preparation Example 3 | Carbon black | — |
| Comparative Preparation Example 4 | TiC + carbon black (at a weight ratio of 20:80) | — |
| Comparative Preparation Example 5 | TiN + carbon black (at a weight ratio of 20:80) | — |
| Comparative Preparation Example 6 | TiC + TiN (at a weight ratio of 1:2) | — |
| Comparative Preparation Example 7 | TiC + TiN + carbon black | — |

Example 1: Preparation of a Positive Electrode

The $TiC_{0.3}N_{0.7}$ composite of Preparation Example 1 was vacuum-dried for 2 hours. 1.2 mg of the dried $TiC_{0.3}N_{0.7}$ composite was mixed with 1.2 mg of a liquid electrolyte in which 1M lithium bis(trifluoromethanesulfonyl)imide (LiTFSI) was dissolved in polyethyleneglycol dimethylether (PEGDME, weight average molecular weight=500) to obtain a positive electrode slurry. The positive electrode slurry was coated on a top surface of a circular lithium-aluminum-titanium-phosphate (LATP, thickness of 250 μm, Ohara Corp., Japan) separator, thereby obtaining a positive electrode stacked on top of the LTAP separator.

Example 2: Preparation of a Positive Electrode

A positive electrode was obtained in the same manner as in Example 1, except that the $TiC_{0.5}N_{0.5}$ composite of Preparation Example 2 was used instead of the $TiC_{0.3}N_{0.7}$ composite of Preparation Example 1.

Example 3: Preparation of a Positive Electrode

A positive electrode was obtained in the same manner as in Example 1, except that the composite material of Preparation Example 3 was used instead of the $TiC_{0.3}N_{0.7}$ composite of Preparation Example 1.

Examples 4-5: Preparation of a Positive Electrode

Positive electrodes were prepared in the same manner as in Example 1, except that the composite materials of Preparation Examples 4 and 5 were each used instead of the $TiC_{0.3}N_{0.7}$ composite of Preparation Example 1.

Comparative Examples 1-7: Preparation of a Positive Electrode

Positive electrodes were prepared in the same manner as in Example 1, except that the materials of Comparative Preparation Examples 1-7 were respectively used instead of the $TiC_{0.3}N_{0.7}$ composite of Preparation Example 1.

Manufacture Example 1: Preparation of a Lithium Air Battery

A separator was disposed on top of a negative electrode (i.e., a lithium metal thin film).

40 microliters (μL) of an electrolyte, i.e., a liquid electrolyte in which 1M LiTFSI was dissolved in PEGDME (weight average molecular weight=500), was injected to the separator (Celgard 3501).

The positive electrode stacked on the LATP separator of Example 1 was disposed on top of the separator such that the LTAP separator was disposed between the separator and the positive electrode.

Then, a gas diffusion layer (GDL, SGL company, 25BC) that allows air to reach the positive electrode was disposed on the positive electrode, and a pressing member was used to press and fix the cell, thereby manufacturing a lithium air battery.

In the lithium air battery, a mixed weight ratio of the composite to the electrolyte was 1:1.

Manufacture Example 1A: Preparation of a Lithium Air Battery

A lithium air battery was manufactured in the same manner as in Manufacture Example 1, except that a mixed weight ratio of the composite to the electrolyte in Example 1 was changed to 1:6 in the manufactured lithium air battery.

Manufacture Example 2: Preparation of a Lithium Air Battery

A lithium air battery was manufactured in the same manner as in Manufacture Example 1, except that the positive electrode of Example 2 was used instead of the positive electrode of Example 1.

Manufacture Example 3: Preparation of a Lithium Air Battery

A lithium air battery was manufactured in the same manner as in Manufacture Example 1, except that the positive electrode of Example 3 was used instead of the positive electrode of Example 1 and that a mixed weight ratio of the composite material to the electrolyte in the manufactured lithium air battery was changed to 1:6.

Manufacture Examples 4-5: Preparation of a Lithium Air Battery

A lithium air battery was manufactured in the same manner as in Manufacture Example 1, except that each of the positive electrodes of Examples 4 and 5 was used instead of the positive electrode of Example 1 and a mixed weight ratio of the composite material to the electrolyte in the manufactured lithium air battery was changed to 1:1.

Manufacture Examples 6-7: Preparation of a Lithium Air Battery

A lithium air battery was manufactured in the same manner as in Manufacture Example 3, except that a mixed weight ratio of the composite material to the electrolyte was changed to 1:4 in Manufacture Example 6 and 1:7 in Manufacture Example 7.

Comparative Manufacture Example 1-2: Preparation of a Lithium Air Battery

A lithium air battery was manufactured in the same manner as in Manufacture Example 1, except that each of the positive electrodes of Comparative Examples 1-2 was used instead of the positive electrode of Example 1.

Comparative Manufacture Example 3: Preparation of a Lithium Air Battery

A lithium air battery was manufactured in the same manner as in Manufacture Example 1, except that the positive electrode of Comparative Example 3 was used instead of the positive electrode of Example 1 and a weight ratio of the carbon black to the electrolyte in the manufactured lithium air battery was changed to 1:6.

Comparative Manufacture Examples 4-7: Preparation of a Lithium Air Battery

A lithium air battery was manufactured in the same manner as in Manufacture Example 1, except that each of the positive electrodes of Comparative Examples 4-7 was used instead of the positive electrode of Example 1 and a weight ratio of each of the materials of Comparative Preparation Examples 4 to 7 to the electrolyte in the manufactured lithium air battery was changed to 1:6.

The compositions of the positive electrodes and the mixed weight ratio of the positive electrode materials to the electrolytes in the lithium air batteries of Manufacture Examples and Comparative Manufacture Examples are summarized in Table 2 below. Here, the positive electrode materials include the composites of Manufacture Examples 1, 1A, and 2, the composite materials of Manufacture Examples 3 to 7, the composite materials of Comparative Manufacture Examples 1 to 3, and the mixed materials of Comparative Manufacture Examples 4 to 7.

TABLE 2

| Example | Composition of positive electrode material | Weight ratio of positive electrode material to electrolyte |
|---|---|---|
| Manufacture Example 1 | $TiC_{0.3}N_{0.7}$ | 1:1 |
| Manufacture Example 1A | $TiC_{0.5}N_{0.5}$ | 1:6 |
| Manufacture Example 2 | $TiC_{0.5}N_{0.5}$ | 1:1 |
| Manufacture Example 3 | $TiC_{0.3}N_{0.7}$ + carbon black (at a weight ratio of 20:80) | 1:6 |
| Manufacture Example 4 | $TiC_{0.3}N_{0.7}$ + carbon black (at a weight ratio of 50:50) | 1:1 |
| Manufacture Example 5 | $TiC_{0.3}N_{0.7}$ + carbon black (at a weight ratio of 70:30) | 1:1 |
| Manufacture Example 6 | $TiC_{0.3}N_{0.7}$ + carbon black (at a weight ratio of 20:80) | 1:4 |
| Manufacture Example 7 | $TiC_{0.3}N_{0.7}$ + carbon black (at a weight ratio of 20:80) | 1:7 |
| CM Example 1 | TiC | 1:1 |
| CM Example 2 | TiN | 1:1 |
| CM Example 3 | carbon black | 1:6 |
| CM Example 4 | TiC + carbon black (at a weight ratio of 70:30) | 1:6 |
| CM Example 5 | TiN + carbon black (at a weight ratio of 70:30) | 1:6 |
| CM Example 6 | TiC + TiN (at a weight ratio of 1:2) | 1:6 |
| CM Example 7 | TiC + TiN + carbon black | 1:6 |

Evaluation Example 1: Evaluation of Average Particle Size and Porosity

The composites of Preparation Examples 1 and 2, the TiC of Comparative Preparation Example 1, and the TiN of Comparative Preparation Example 2, and the mixed material of Comparative Preparation Example 3 were evaluated in terms of an average particle size, a specific surface area, a pore size, and a pore volume.

The specific surface area, the pore size, and the pore volume of the composites, the materials, and the mixed materials were each measured by Brunauer-Emmett-Teller (BET) and Barrett-Joyner-Halenda (BJH) methods. The evaluation of micropores and the external surface area was performed by a t-plot method. The evaluation results are shown in Table 3 below.

TABLE 3

| Division | Average particle size (nm) | Specific surface area ($m^2/g$) | Pore size* (nm) | Pore volume ($cm^3/g$) |
|---|---|---|---|---|
| Preparation Example 1 | 38.9 | 18.2 | 2.1 | 0.09 |
| Preparation Example 2 | 30.2 | 38.2 | 2.2 | 0.11 |
| Comparative Preparation Example 1 | 52.4 | 30.4 | 4.8 | 0.10 |
| Comparative Preparation Example 2 | 20.3 | 20.7 | 1.8 | 0.07 |
| Comparative Preparation Example 3 | 30.0 | 1000 | 21.1 | 4.95 |

*The pore size measured herein refers to a pore diameter.

Referring to Table 3, it was confirmed that the size of both of the composites of Preparation Examples 1 and 2 was nanoscale with an average particle diameter of less than about 50 nm and had a small specific surface area.

The cross-section of the composites of Preparation Examples 1 and 2 was measured by using a scanning transmission electron microscope (STEM), and the results are shown in Table 4 below. A STEM analyzer used herein was S-5500 (Hitachi).

TABLE 4

| Division | Cross-section ($nm^2$) |
|---|---|
| Preparation Example 1 | 45 |
| Preparation Example 2 | 35 |

Referring to Table 4, it was confirmed that the composites of Preparation Examples 1 and 2 had a large cross-section, which may maximize an active site of the positive electrode including the composite. In this regard, a battery employing the positive electrode was able to improve the battery performance.

Evaluation Example 2: Scanning Electron Microscope (SEM) and Scanning Transmission Electron Microscope (STEM) Analysis The composites of Preparation Examples 1 and 2, TiC of Comparative Preparation Example 1, and TiN of Comparative Preparation Example 2 were subjected to SEM and STEM analysis. A measuring device used herein was S-5500 (Hitachi).

The analysis results are shown in FIGS. 2A to 5C and Table 5 below.

Figure 2A:
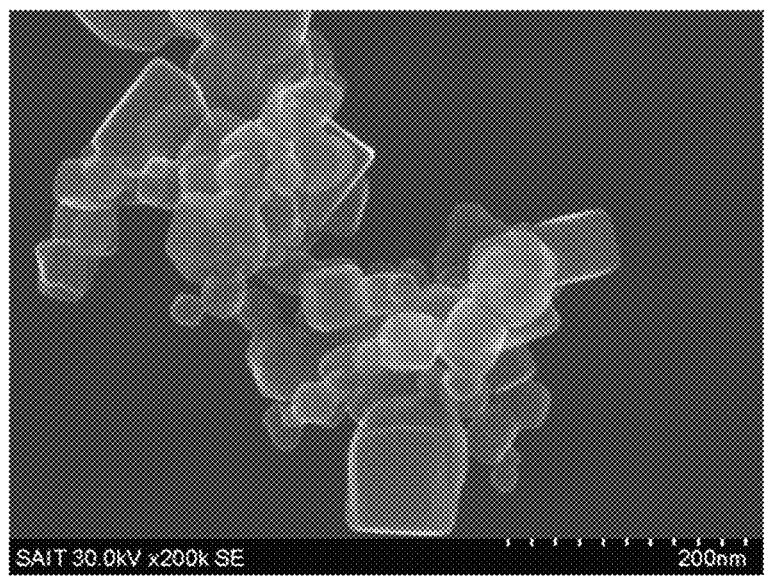
FIGS. 2A, 3A, 4A, and 5A are scanning electron microscopy (SEM) images of composites prepared in Preparation Examples 1 and 2 and materials prepared in Comparative Preparation Examples 1 and 2, respectively.
Figure 2B:
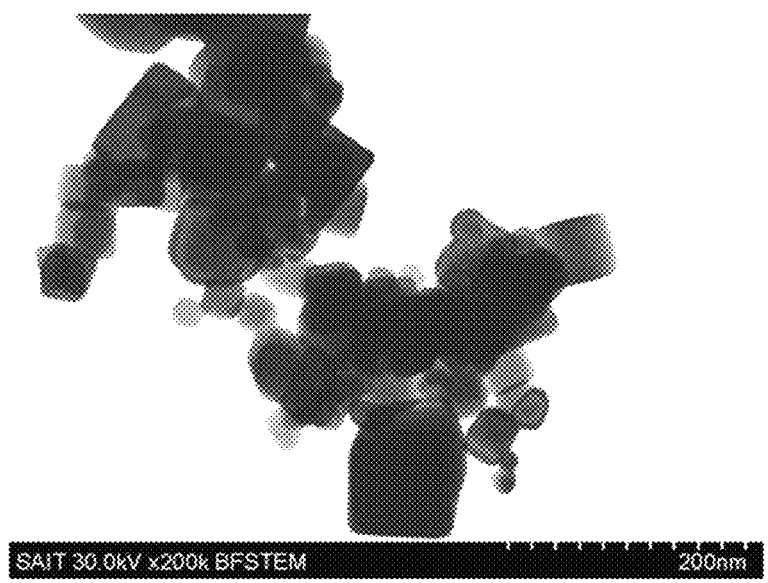
FIGS. 2B and 2C are scanning transmission electron microscopy (STEM) images of a composite prepared in Preparation Example 1 at different magnifications.
Figure 2C:
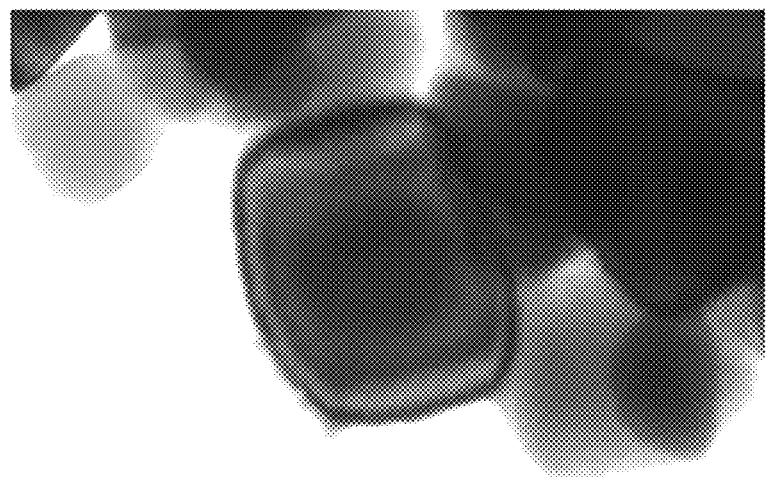
Figure 2D:
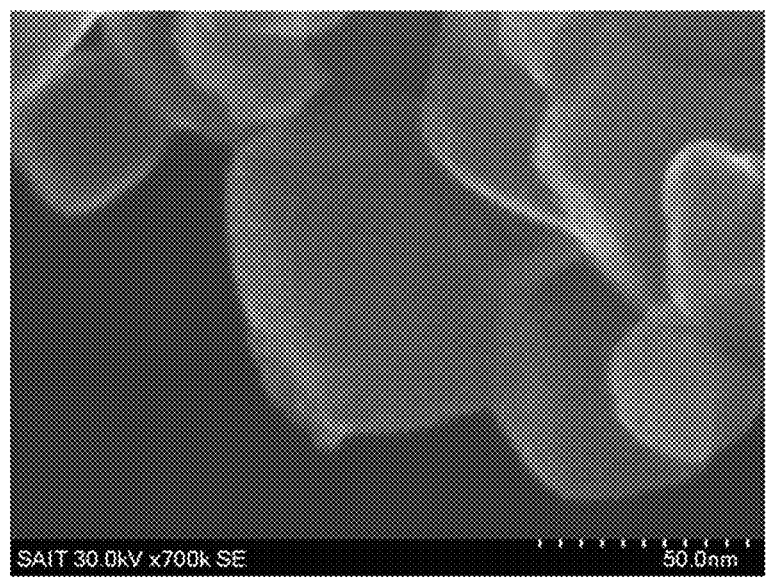
FIG. 2D is an SEM image of a composite prepared in Preparation Example 1.

FIG. 2A is an SEM image of the composite of Preparation Example 1, FIGS. 2B and 2C are each an STEM image of the composite of Preparation Example 1 at different magnifications, and FIG. 2D is an enlarged SEM image of FIG. 2A at a high magnification.

Figure 3A:
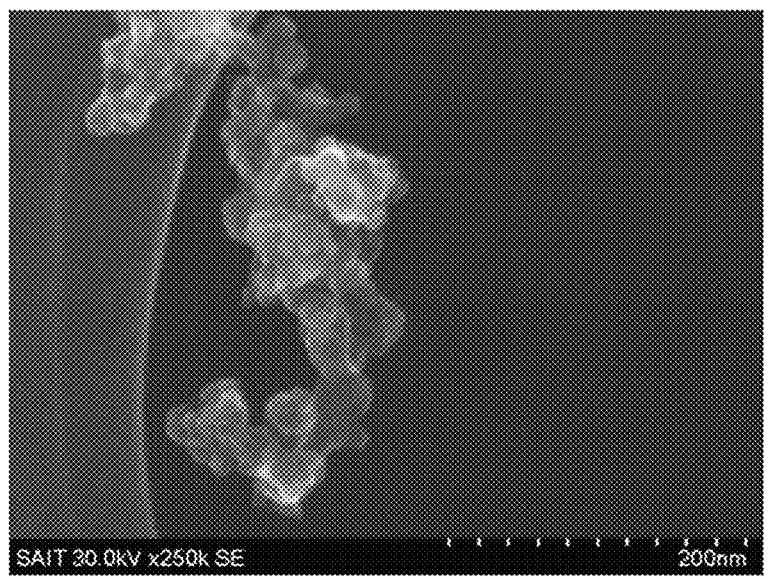
Figure 3B:
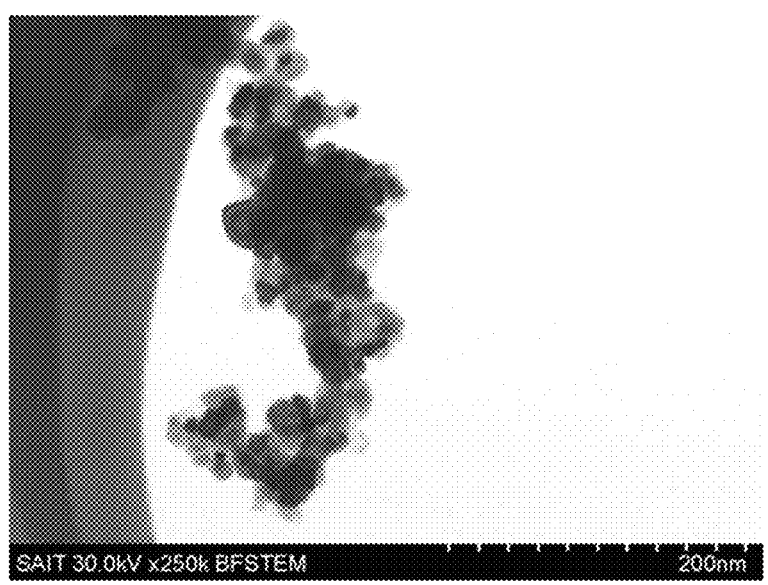
FIGS. 3B and 3C are STEM images of a composite prepared in Preparation Example 2 at different magnifications
Figure 3C:
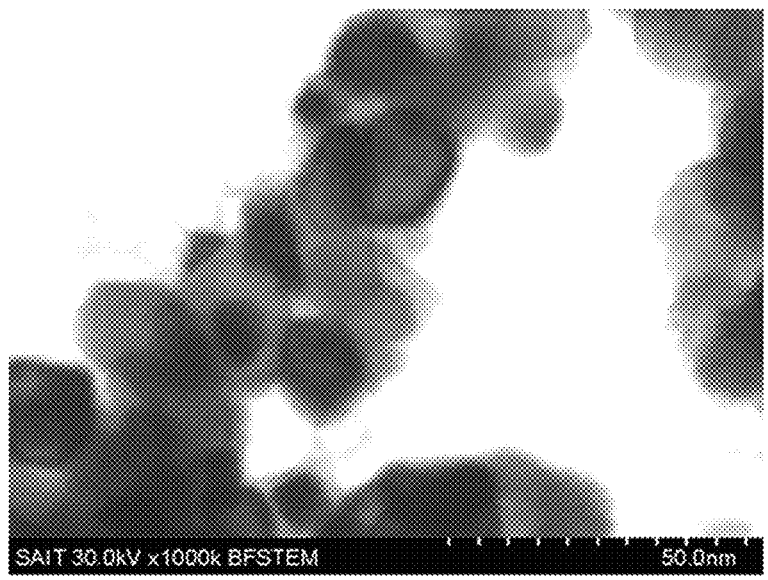
Figure 3D:
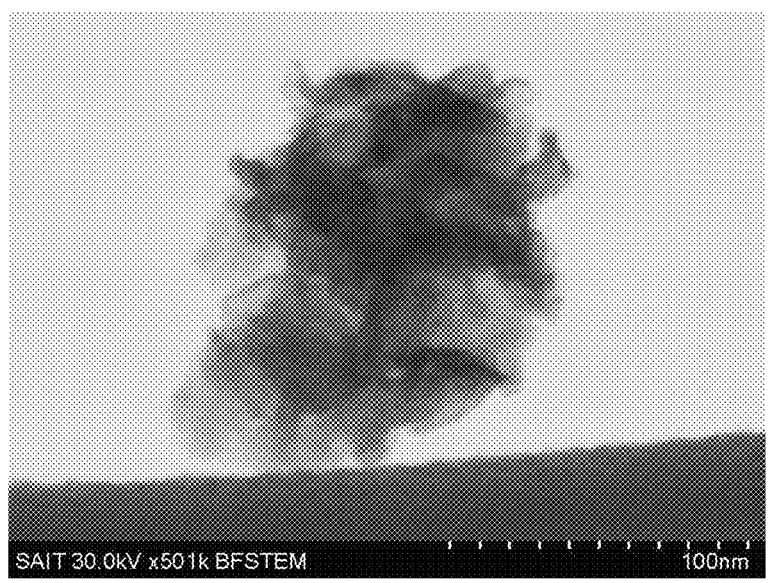
FIG. 3D is an SEM image of a composite prepared in Preparation Example 7.

FIG. 3A is an SEM image of the composite of Preparation Example 2, FIGS. 3B and 3C are each an STEM image of the composite of Preparation Example 2, and FIG. 3D is an SEM image of the composite of Preparation Example 7, at different magnifications.

Figure 4A:
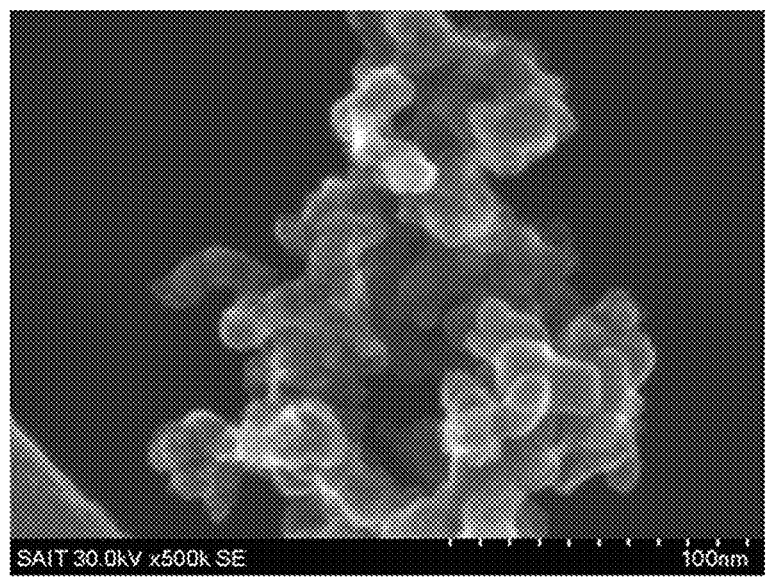
Figure 4B:
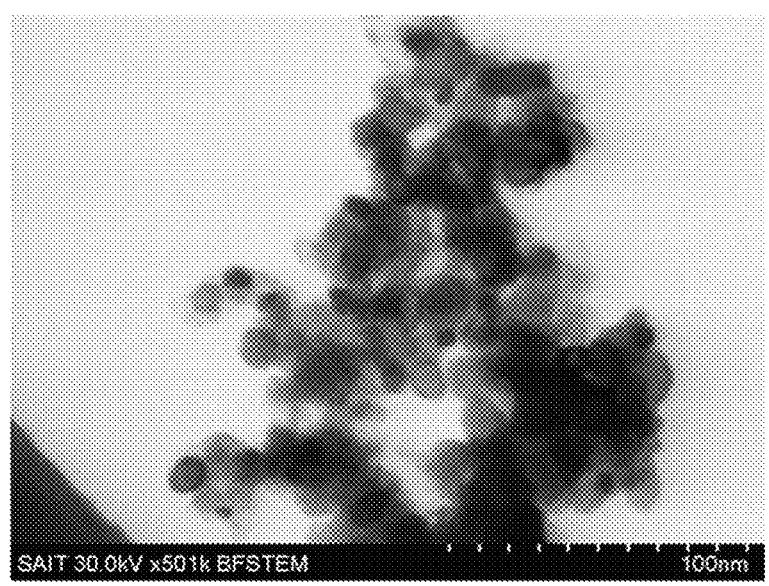
FIGS. 4B and 4C are STEM images of a material prepared in Comparative Preparation Example 1 at different magnifications.
Figure 4C:
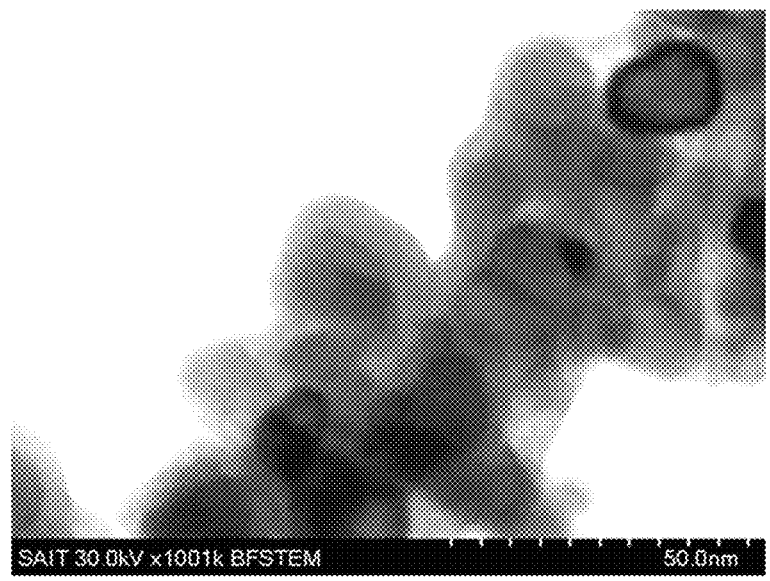
Figure 5A:
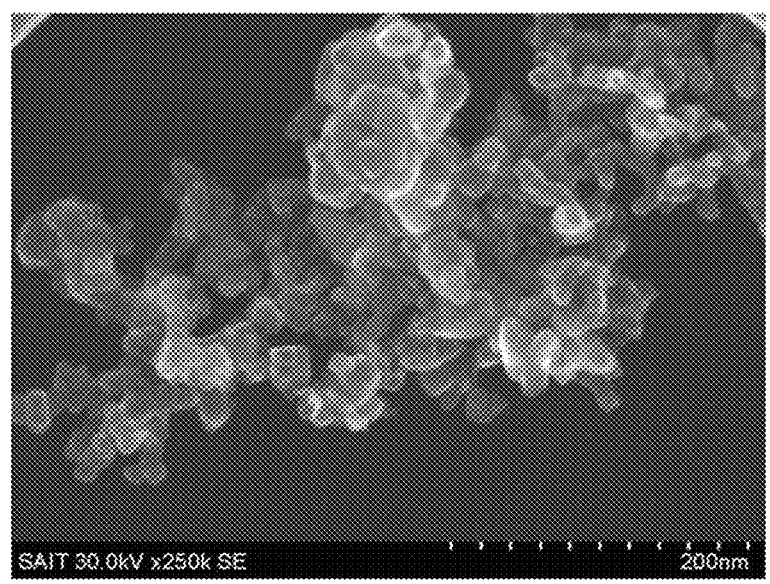
Figure 5B:
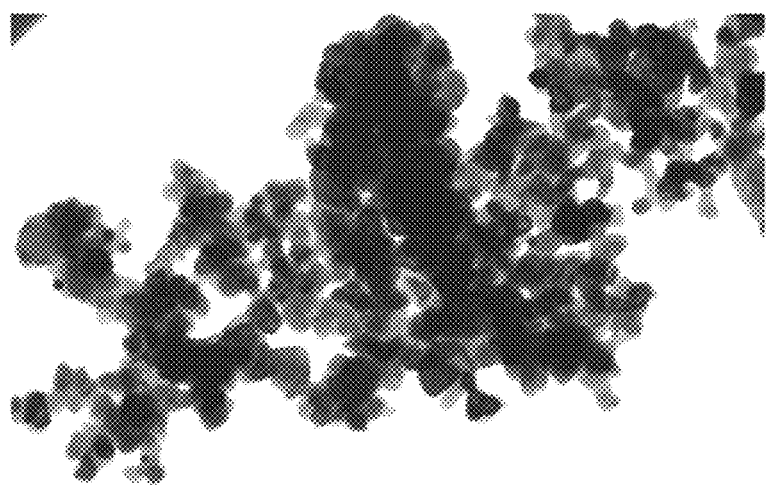
FIGS. 5B and 5C are STEM images of a material prepared in Comparative Preparation Example 2 at different magnifications.
Figure 5C:
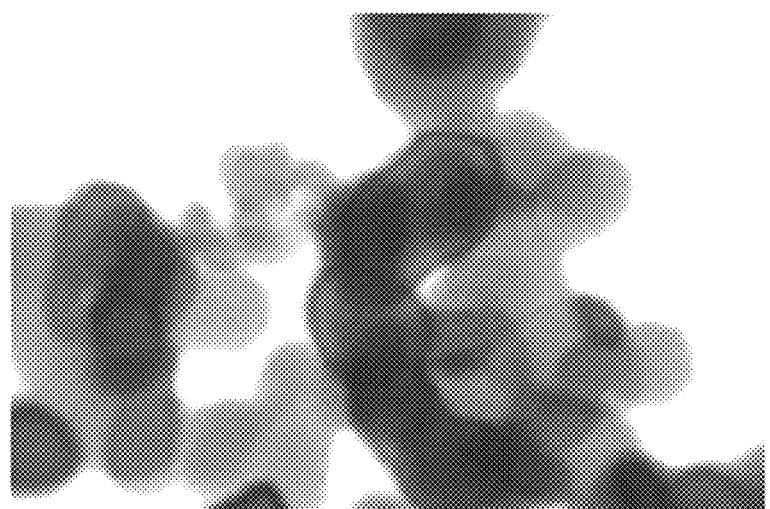

FIGS. 4A and 5A are each an SEM image of the materials of Comparative Preparation Examples 1 and 2, FIGS. 4B and 4C are each an STEM image of the material of Comparative Preparation Example 1, and FIGS. 5B and 5C are each an STEM image of the material of Comparative Preparation Example 2.

In Table 5 below, the composites of Preparation Examples 1 and 2 and the materials of Comparative Preparation Examples 1 to 3 were each subjected to STEM to measure average particle sizes thereof. Here, the average particle size represents the longest side or diameter in each of the composites and the materials.

TABLE 5

| Division | Average particle diameter (nm) |
|---|---|
| Preparation Example 1 | 38.9 |
| Preparation Example 2 | 30.2 |
| Comparative Preparation Example 1 | 52.4 |
| Comparative Preparation Example 2 | 20.3 |
| Comparative Preparation Example 3 | 35.0 |

Referring to Table 5, it was confirmed that the composite of Preparation Examples 1 and 2 had nano-sized average particle diameters that are about 50 nm or less.

In addition, referring FIGS. 2A-2D, FIGS. 3A-3C, and FIGS. 4A-4C, it was confirmed that the materials of Comparative Preparation Examples 1 and 2 are formed of amorphous particles, wherein the composites of Preparation Examples 1 and 2 had a cube structure or a cube-like structure.

Evaluation Example 3: Transmission Electronic Microscopy (TEM) and Elemental Mapping The composite of Preparation Example 1 was subjected to TEM and elemental mapping analysis.

Figure 6A:
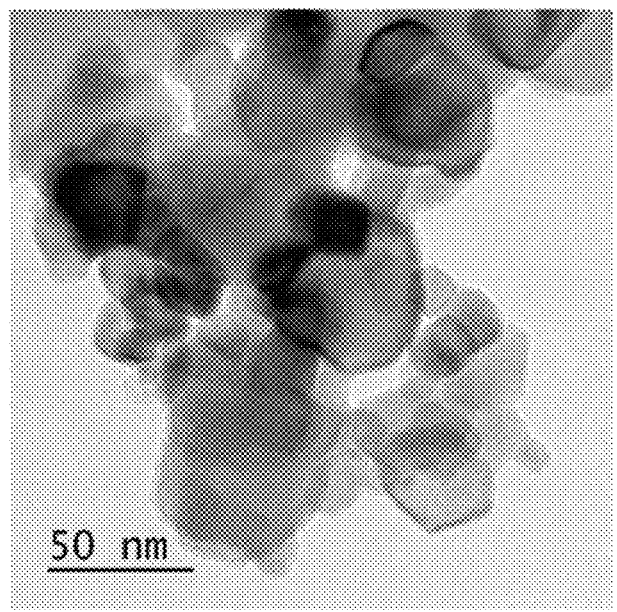
FIGS. 6A and 6B are transmission electron microscope (TEM) images of a composite prepared in Preparation Example 1 at different magnifications.
Figure 6B:
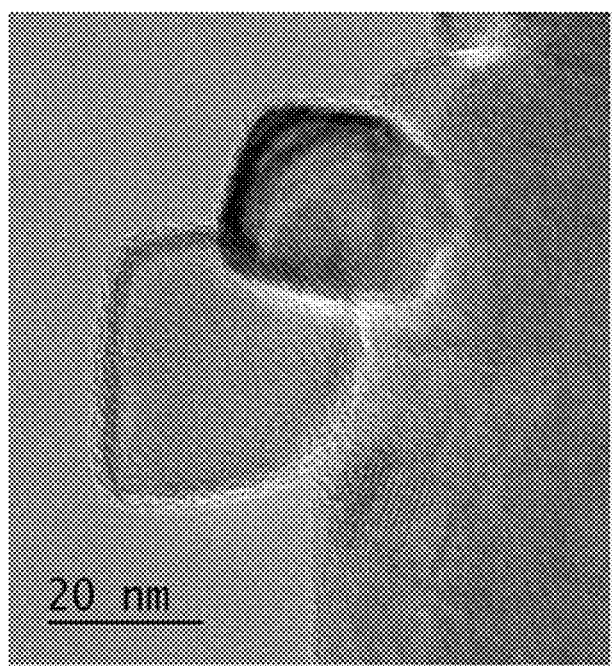

The TEM analysis results are shown in FIGS. 6A and 6B, and the elemental mapping analysis results are shown in FIGS. 7A to 7D. Here, the elemental mapping analysis was used to confirm whether titanium, nitrogen, and carbon atoms are present in each area of the composite.

Figure 7A:
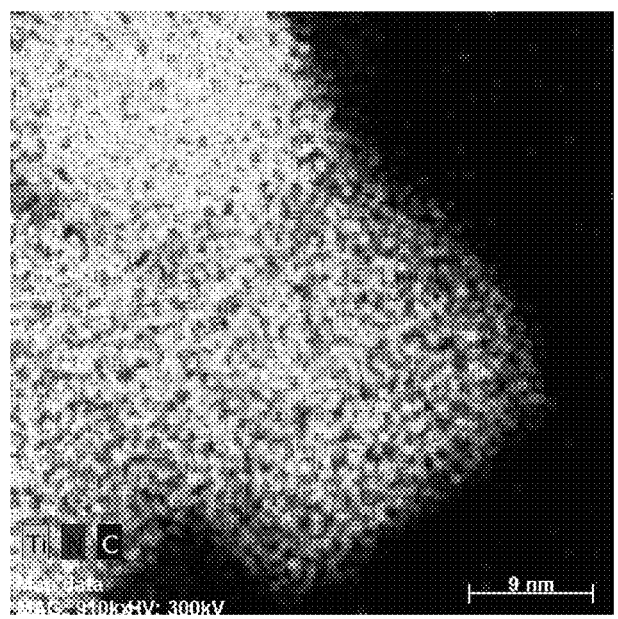
FIGS. 7A to 7D are elemental mapping results of a composite prepared in Preparation Example 1.
Figure 7B:
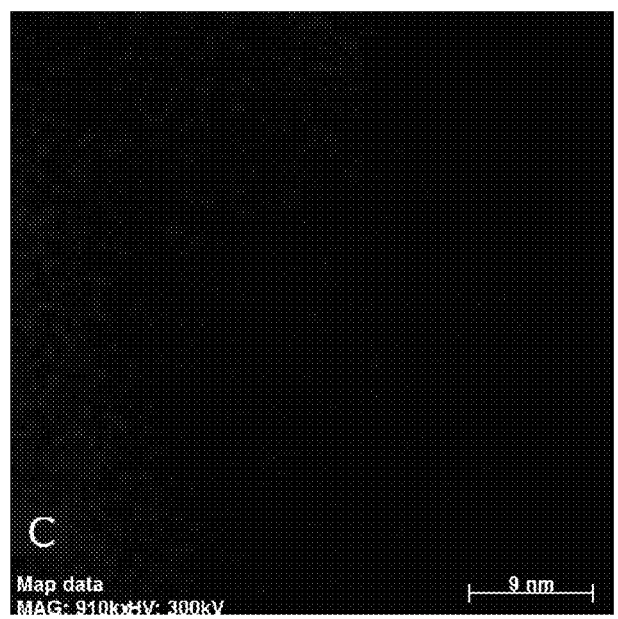
Figure 7C:
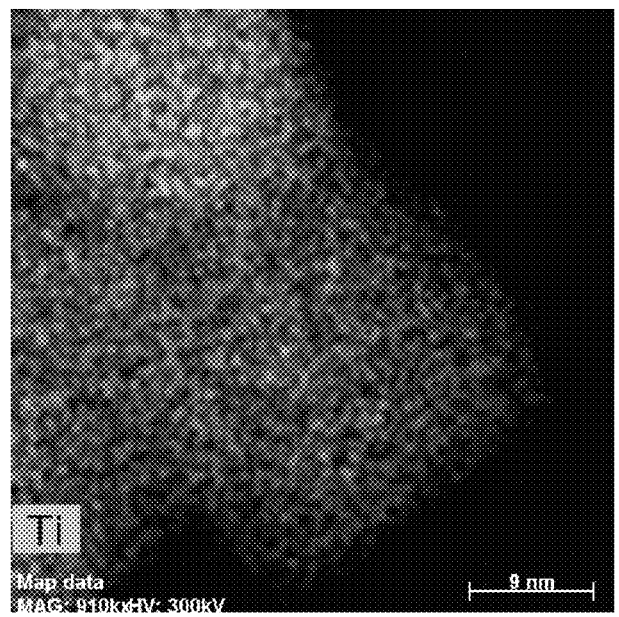
Figure 7D:
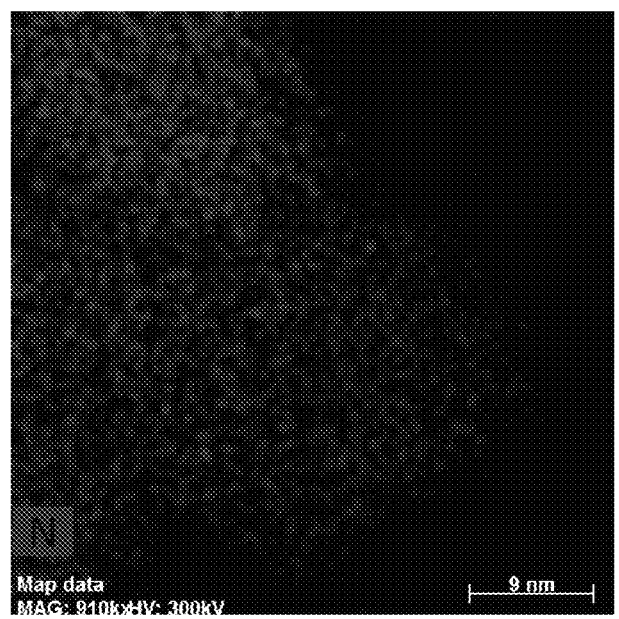
Figure 7E:
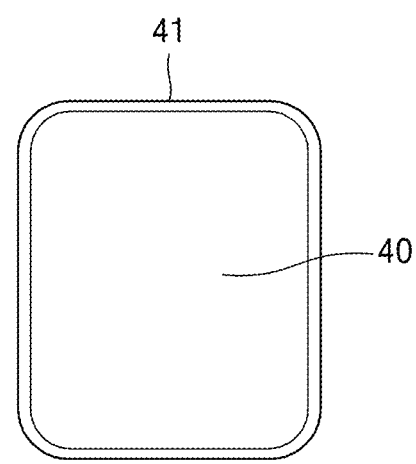
FIG. 7E is a schematic view of an embodiment of a lithium air battery.

FIG. 7A is an overall image showing the result of the elemental mapping analysis of the composite of Preparation Example 1, FIG. 7B is an image showing the result of the elemental mapping analysis with respect to carbon of the composite of Preparation Example 1, FIG. 7C is an image showing the result of the elemental mapping analysis with respect to titanium of the composite of Preparation Example 1, and FIG. 7D is an image showing the result of the elemental mapping analysis with respect to nitrogen of the composite of Preparation Example 1. FIG. 7E is a schematic view of the structure of the composite. As illustrated in FIG. 7E, the composite may have a structure in which a carbonaceous layer 41 is formed on top of TiCN 40

Referring to FIGS. 6A and 6B, it was confirmed that the composite was formed in a hexahedron shape such as a rectangular parallelepiped shape or a hexadron-like shape. Referring to FIGS. 7A to 7D, it was confirmed that Ti, C, and N were present in a central part of the composite, and especially, C was found to exist in the entire area of the composite. Accordingly, it was confirmed that the composite was formed of TiCN as shown in FIG. 7E and had a structure in which the carbonaceous layer 41 formed on the TiCN 40.

Evaluation Example 4: X-Ray Diffraction (XRD) Analysis

The composites of Preparation Examples 1 and 2 and the materials of Comparative Preparation Examples 1 and 2 were subjected to X-ray diffraction (XRD) analysis using a Cu—Kα ray. The XRD was performed by using Cu—Kα radiation diffractometer (Rigaku RINT2200HF+ using 1.540598 Å).

As a result, diffraction peaks appeared at a diffraction angle (2θ) of a (200) plane in a range of about 42.2° to about 42.5°. Then, a particle diameter of the crystals of the composites was obtained by a full width at half maximum (FMWH) of the diffraction peaks of the (200) plane. Here, an average particle diameter (La) of the crystals was calculated based on the Scherrer equation represented by Equation 1 below:

$$La = (0.9\lambda)/(\beta \cos \theta) \quad \text{Equation 1}$$

wherein in Equation 1, λ denotes an X-ray wavelength (about 1.54λ) and β denotes an FWHM of a Bragg angle.

Figure 8:
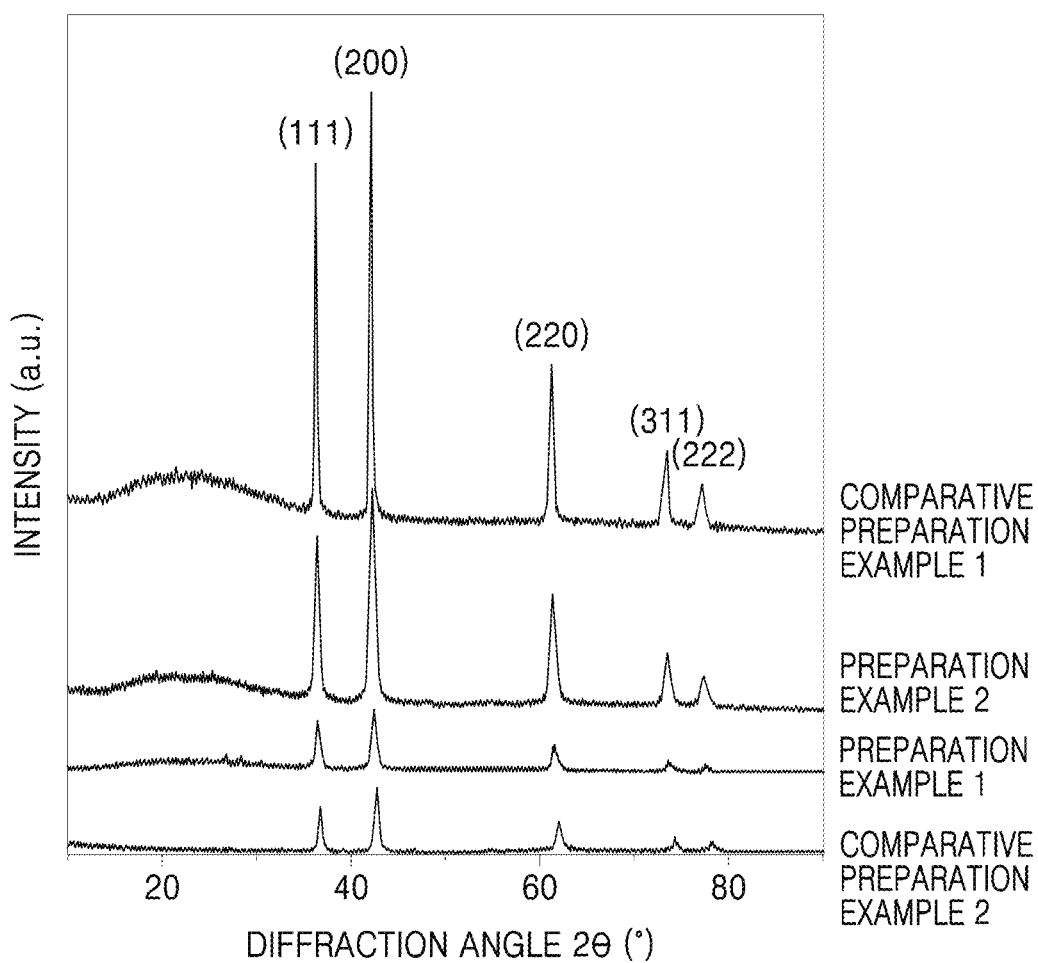
FIG. 8 is a graph of intensity (arbitrary units, a.u.) versus diffraction angle (degrees two-theta, 2θ) showing results of X-ray diffraction (XRD) analysis of composites prepared in Preparation Examples 1 and 2 and materials prepared in Comparative Preparation Examples 1 and 2.
Figure 9A:
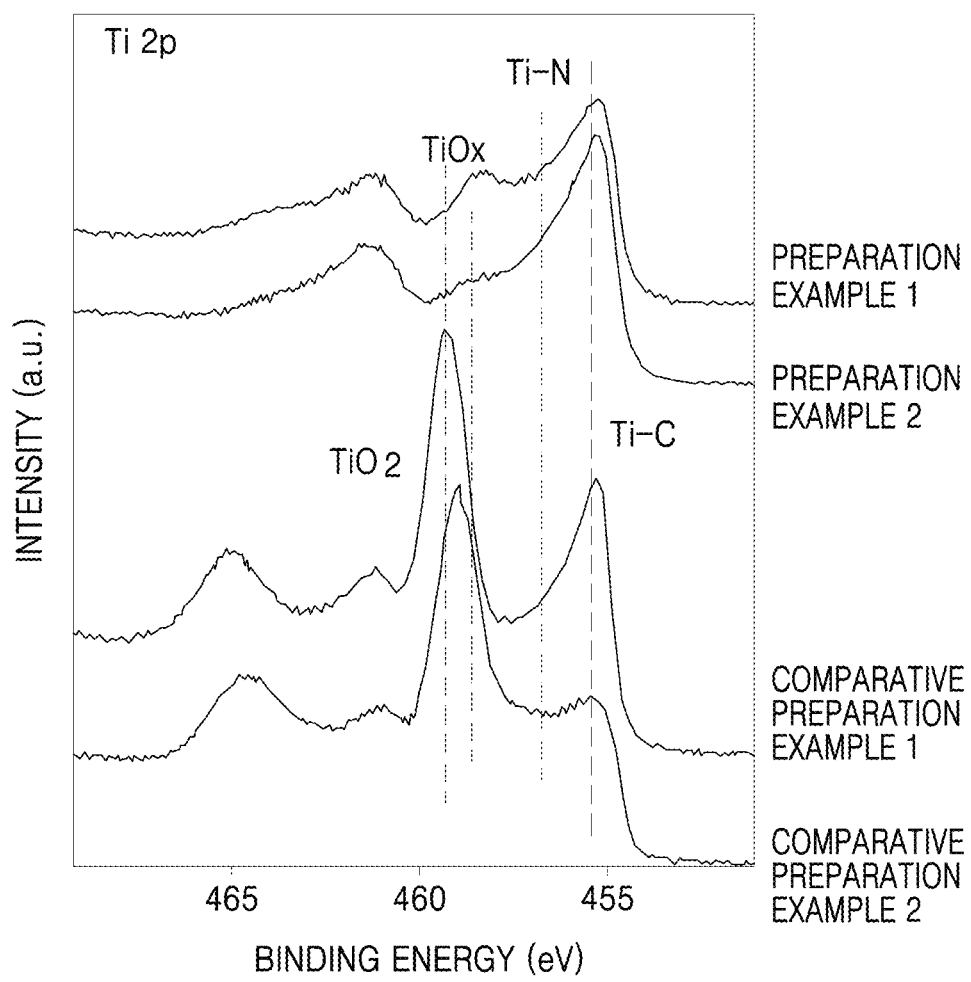
FIGS. 9A to 9D are each a graph of intensity (arbitrary units, a.u.) versus binding energy (electron volts, eV) showing results of X-ray photoelectron spectroscopy (XPS) analysis of composites prepared in Preparation Examples 1 and 2 and materials prepared in Comparative Preparation Examples 1 and 2
Figure 9B:
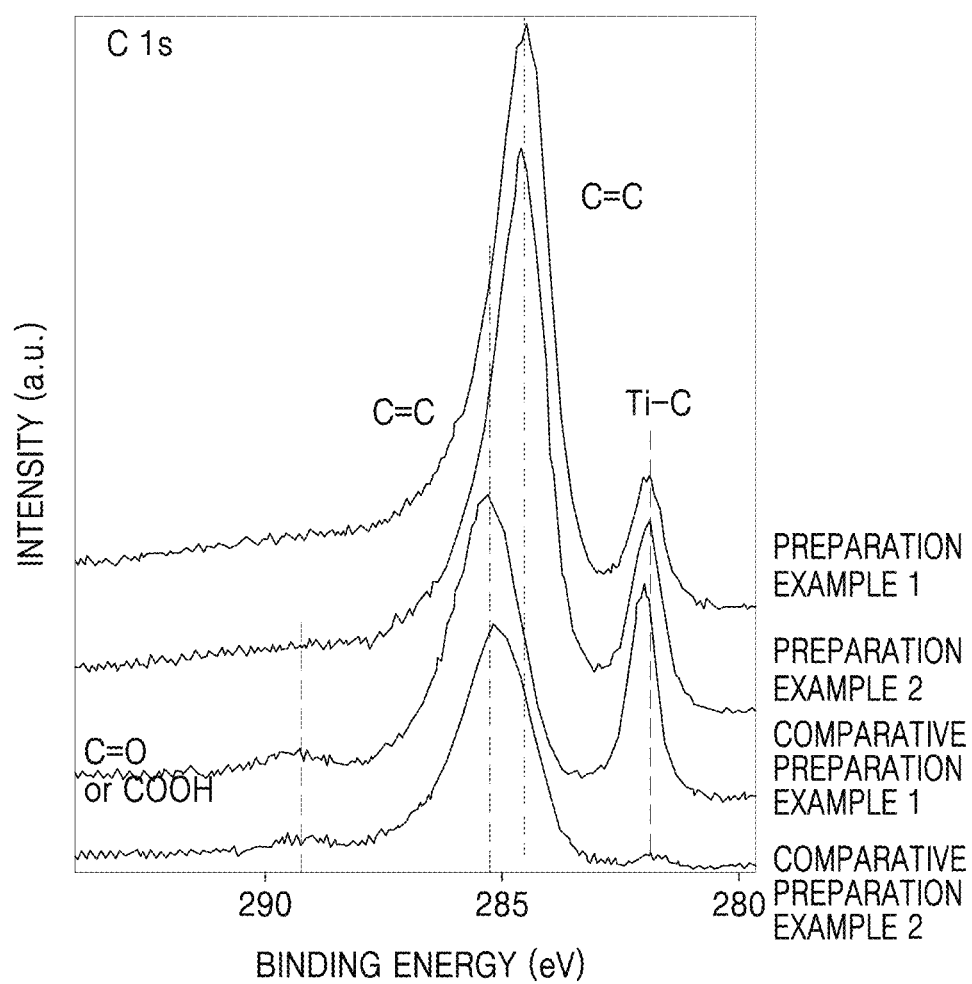
Figure 9C:
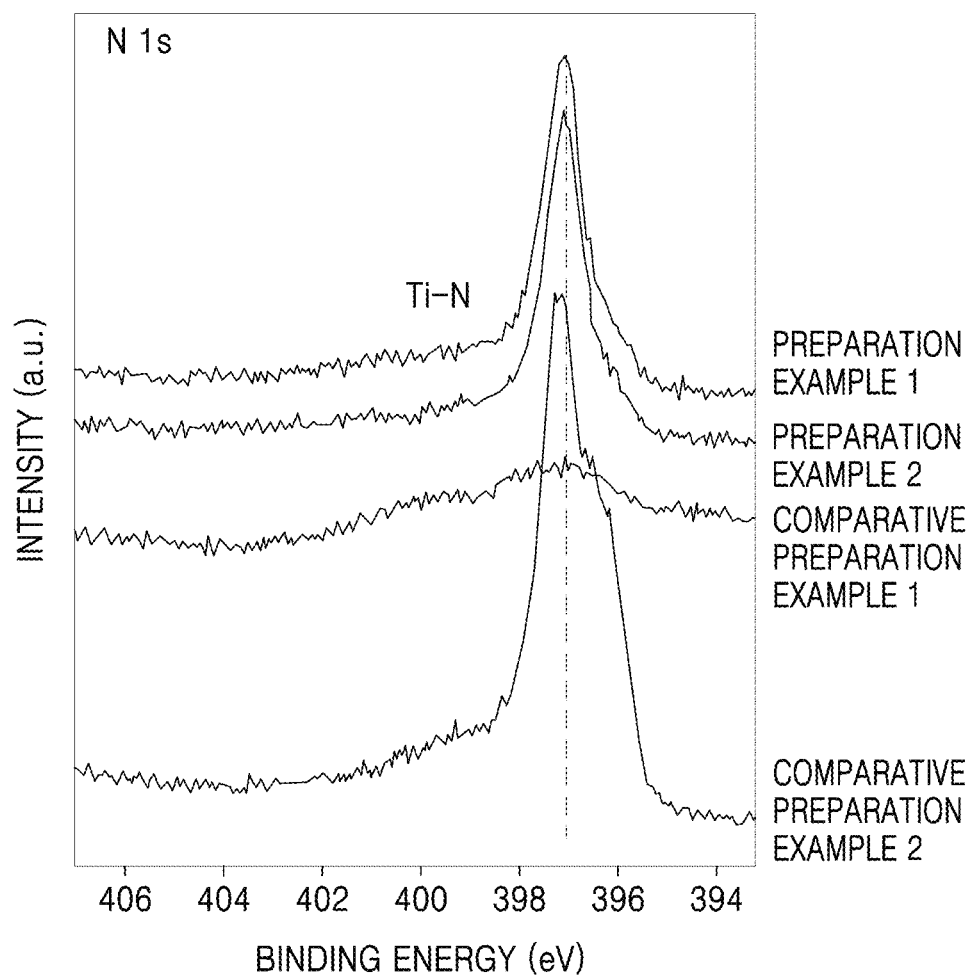
Figure 9D:
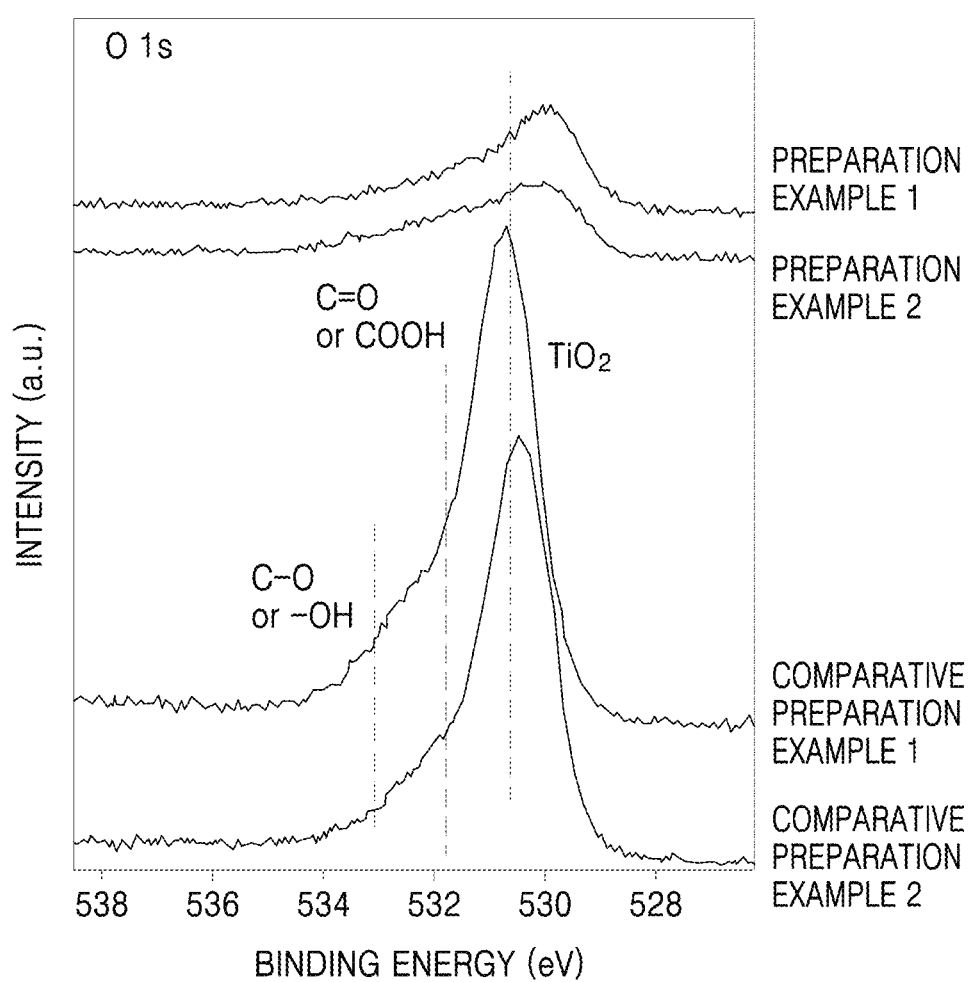
Figure 9E:
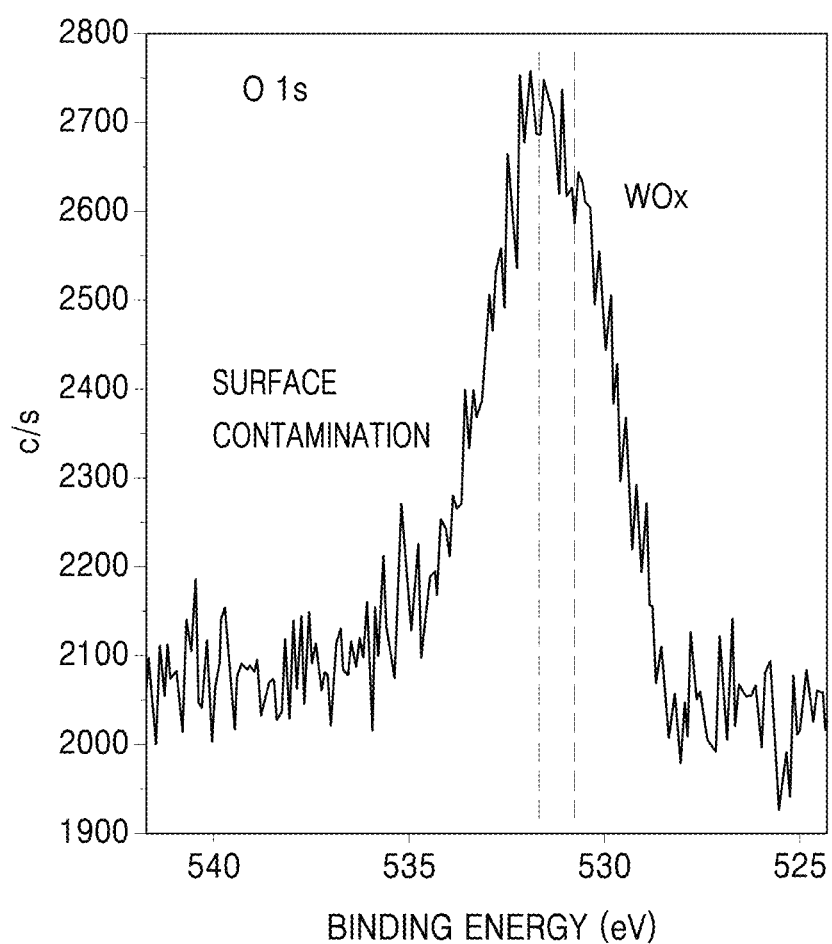
FIGS. 9E to 9H are each a graph showing results of XPS of a composite prepared in Preparation Example 7.
Figure 9F:
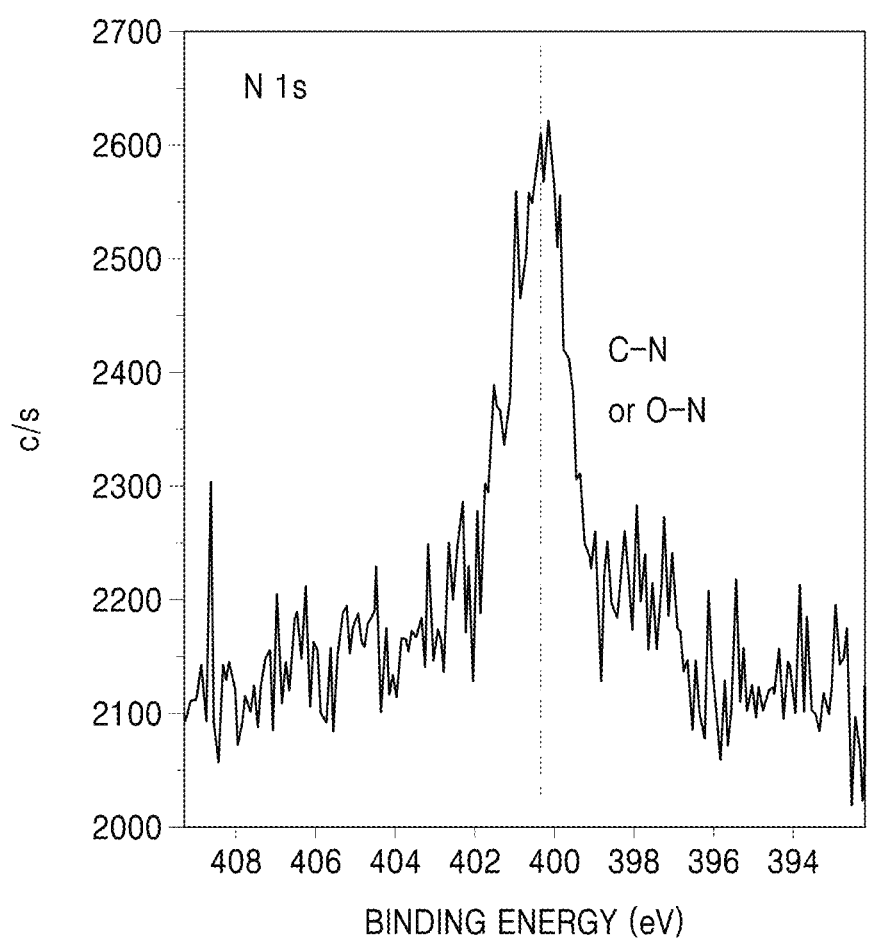
Figure 9G:
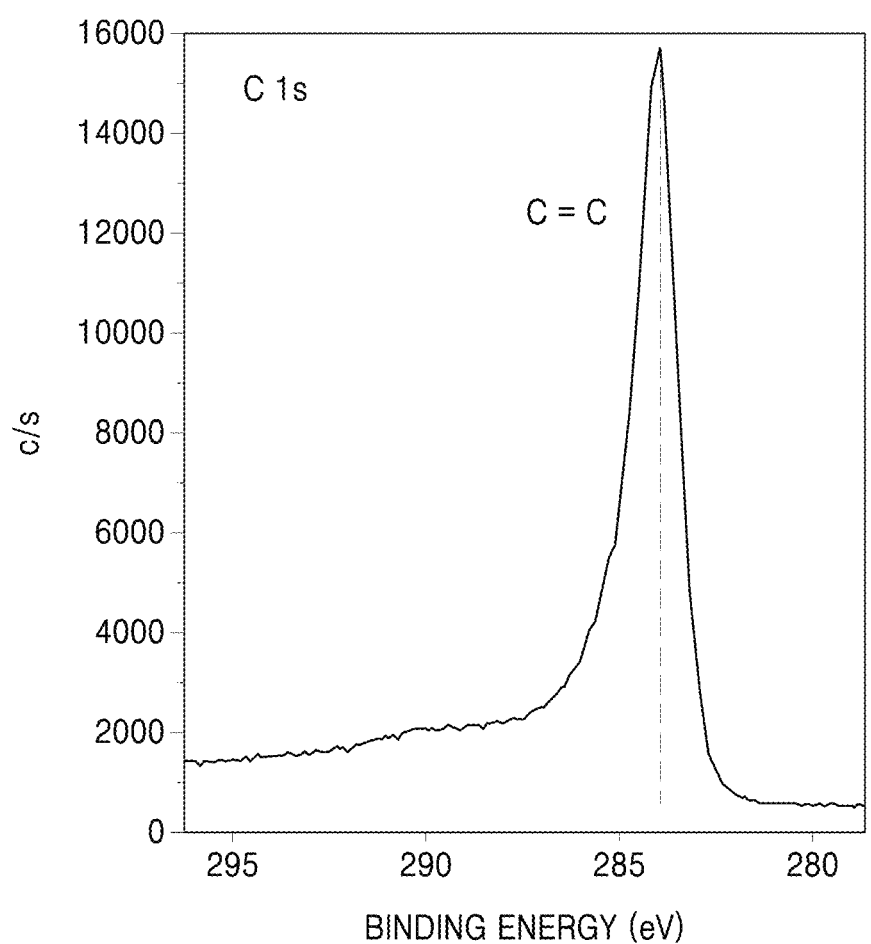
Figure 9H:
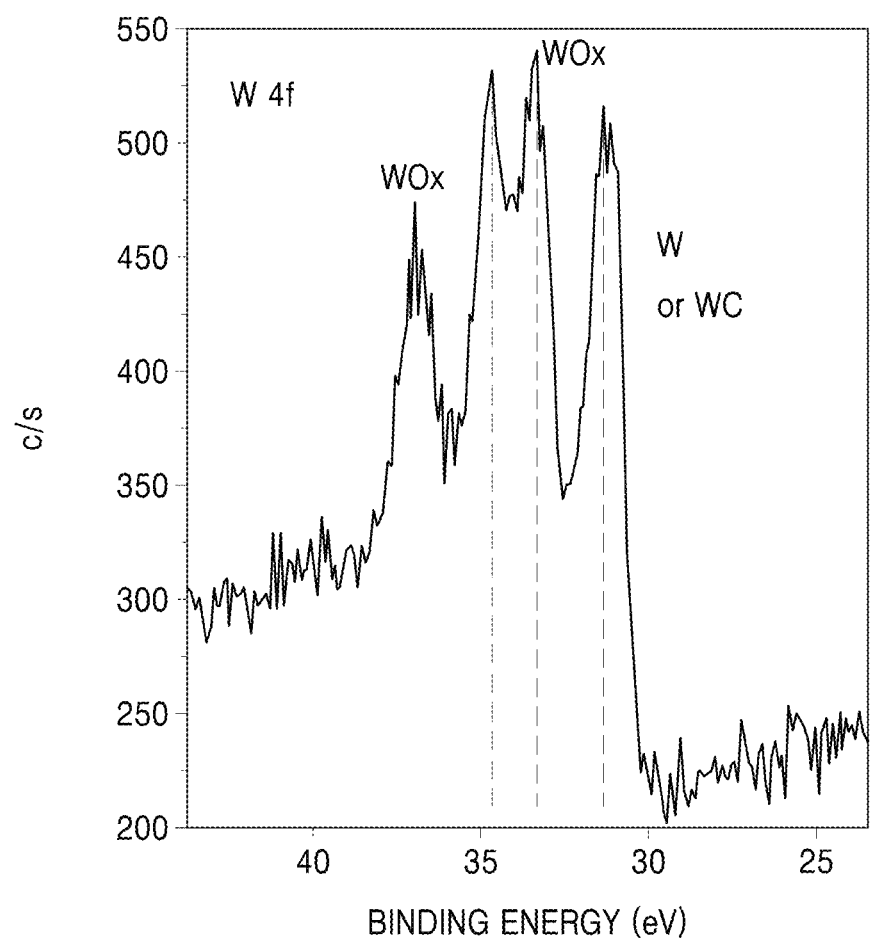

The XRD results are shown in FIG. 8 and Table 6 below.

Referring to these results, it was able to identify the composition of the composites of Preparation Examples 1 and 2 and the materials of Comparative Preparation Examples 1 and 2. In addition, it was confirmed that the diffraction angle (2θ) with respect to the main peaks moved toward the smaller angles according to the increasing C/N ratios and that the composite of Preparation Example 1 had low crystallinity.

TABLE 6

| Division | Average particle diameter of crystal (nm) |
|---|---|
| Preparation Example 1 | 48.7 |
| Preparation Example 2 | 35.6 |
| Comparative Preparation Example 1 | 53.5 |
| Comparative Preparation Example 2 | 24.5 |

Referring to Table 6, it was confirmed that the composites of Preparation Examples 1 and 2 were both formed of nano-sized crystals having an average particle diameter (La) of 50 nm or less.

Evaluation Example 5: XPS Analysis

The composites of Preparation Examples 1 and 2 and the materials of Comparative Preparation Examples 1 and 2 were subjected to X-ray photoelectron spectroscopy (XPS) using a Quantum 2000 device (Physical Electronics).

The XPS results are shown in FIGS. 9A to 9H.

FIGS. 9E to 9H are each a graph showing results of XPS of the composite of Preparation Example 7.

Referring to FIGS. 9A to 9D, it was confirmed that titanium was bonded to carbon and nitrogen (i.e., the presence of C—Ti—N bonding was confirmed).

Referring to FIGS. 9E to 9H, it was confirmed that the composite of Preparation Example 7 was formed of W—N and C—N covalent bonds.

Evaluation Example 6: Evaluation of Discharge Characteristics

In an oxygen atmosphere at a temperature of 60° C. and pressure of 1 atm, the lithium air batteries of Manufacture Examples 1 and 2 and Comparative Manufacture Examples 1, 2, and 6 were discharged with a constant current of 0.24 mA/cm$^2$ until a voltage thereof reached 2.0 V (vs. Li), and then, charged with the same constant current until a voltage thereof reached 4.2 V, thereby completing the first charge and discharge cycle. A part of the charge and discharge test in the first cycle is shown in FIG. 10.

Regarding the discharge capacity of the battery, the unit weight is that of the positive electrode including the positive electrode material selected from the composite materials of Manufacture Examples 1 and 2 and the material of Comparative Manufacture Examples 1 and 2.

Figure 10:
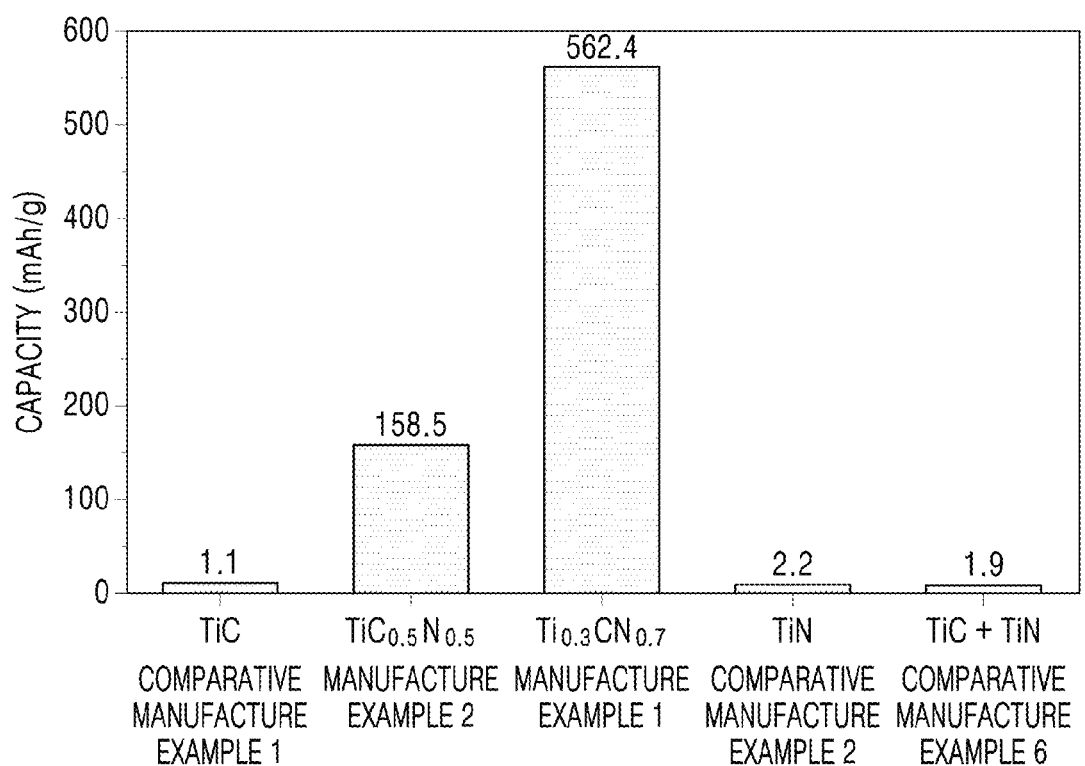
FIG. 10 is a graph of capacity (milliampere-hours per gram, mAh/g) showing capacity characteristics of lithium air batteries prepared in Manufacturing Examples 1 and 2 and Comparative Manufacturing Examples 1 and 2.

As shown in FIG. 10, the discharge capacity of the lithium air batteries of Manufacture Examples 1 and 2 increased as compared with those of Comparative Manufacture Examples 1, 2, and 6. Such an increase in the discharge capacity means that the activity of the positive electrode was improved by more oxygen being transferred into the positive electrode, i.e., by the increased oxygen concentration in the positive electrode.

Evaluation Example 7: Evaluation of Charge and Discharge Characteristics

1) Manufacture Example 3 and Comparative Manufacture Example 3

The lithium air batteries of Manufacture Example 3 and Comparative Manufacture Example 3 were subjected to a first charge and discharge cycle at a temperature of 60° C. Here, the lithium air battery of Manufacture Example 3 included the composite material and the electrolyte at a mixing weight ratio of 1:6, and the lithium air battery of Comparative Manufacture Example 3 included the carbon black and the electrolyte at a mixing weight ratio of 1:6.

The lithium air batteries of Manufacture Example 3 and Comparative Manufacture Example 3 were each charged with a constant current of 0.1 C until a voltage thereof reached 4.7 V, and then, discharged with the same constant current until a voltage thereof reached 2.0 V.

Figure 11A:
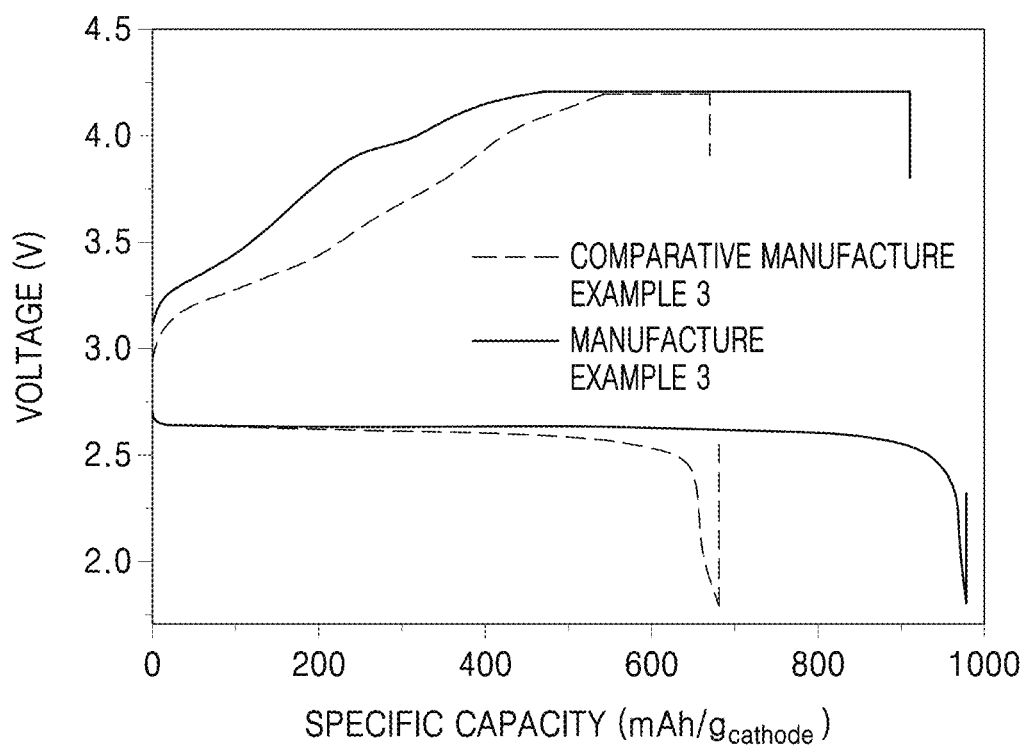
FIG. 11A is a graph of voltage (volts, V) versus specific capacity (milliampere-hours per gram of the cathode, mAh/$g_{cathode}$) showing voltage changes according to specific capacities of lithium air batteries prepared in Manufacturing Example 3 and Comparative Manufacturing Example 3.

The charge and discharge results are shown in FIG. 11A.

Referring to FIG. 11A, it was confirmed that that the lithium air battery of Manufacture Example 3 had excellent charge and discharge characteristics as compared with the lithium air battery of Comparative Manufacture Example 3.

2) Manufacture Example 1

The lithium air battery of Manufacture Example 1 was subjected to a first charge and discharge cycle at a temperature of 60° C. Here, the lithium air battery included the composite and the electrolyte at a mixing weight ratio of 1:1.

The lithium air battery of Manufacture Example 1 was charged with a constant current of 0.1 C until a voltage thereof reached 4.7 V, and then, discharged with the same constant current until a voltage thereof reached 2.0 V.

Figure 11B:
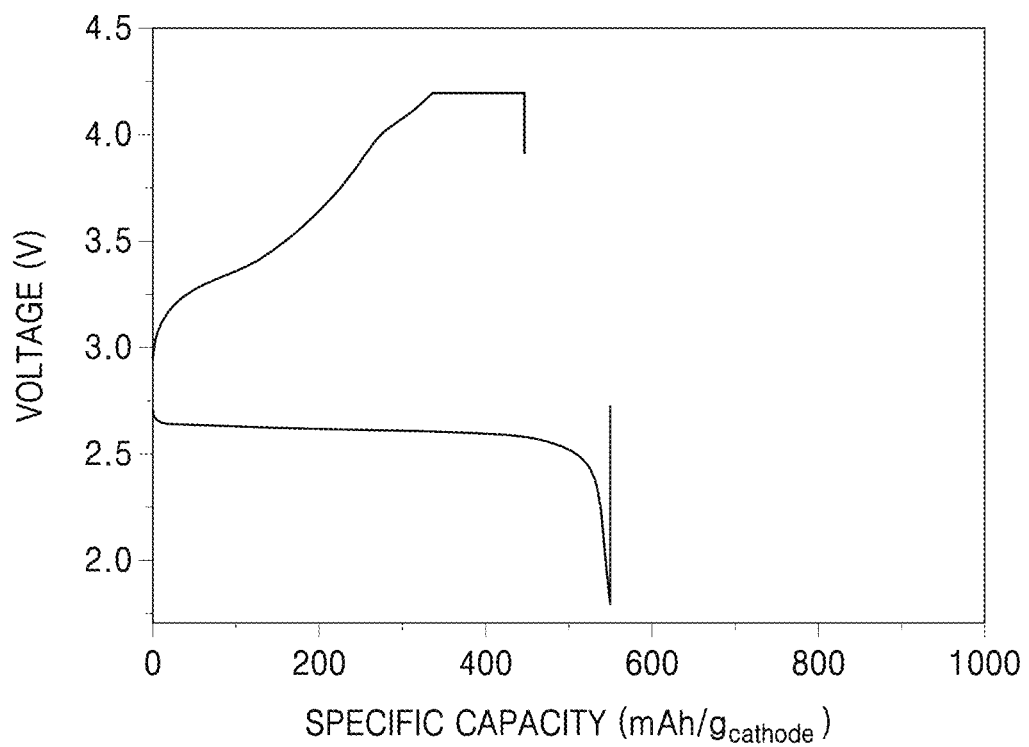
FIG. 11B is a graph a graph of voltage (volts, V) versus specific capacity (milliampere-hours per gram of the cathode, mAh/$g_{cathode}$) showing voltage changes according to specific capacities of a lithium air battery prepared in Manufacturing Example 1.

The charge and discharge results are shown in FIG. 11B.

Referring to FIG. 11B, it was confirmed that the lithium air battery of Manufacture Example 1 had excellent charge and discharge characteristics.

3) Manufacture Examples 3-4 and Comparative Manufacture Example 3

The lithium air batteries of Manufacture Examples 3 and 4 and Comparative Manufacture Example 3 were subjected to a first charge and discharge cycle at a temperature of 60° C. The lithium air batteries of Manufacture Examples 3 and 4 and Comparative Manufacture Example 3 were each charged with a constant current of 0.1 C until a voltage thereof reached 4.7 V, and then, discharged with the same constant current until a voltage thereof reached 2.0 V.

Figure 12:
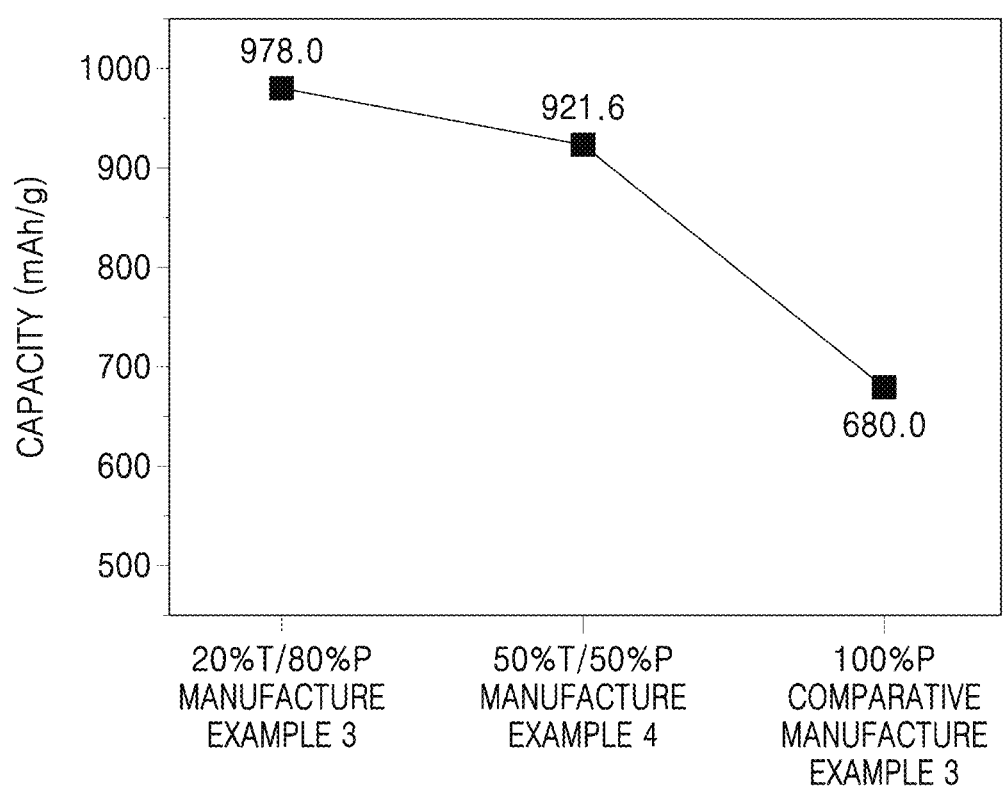
FIG. 12 is a graph of capacity (mAh/g) showing capacity characteristics of lithium air batteries prepared in Manufacturing Examples 3 and 4 and Comparative Manufacturing Example 3.

The changes in capacities of the lithium air batteries were examined according to the mixing ratio of the composite to the carbonaceous material, and the results thereof are shown in FIG. 12.

Referring to FIG. 12, it was confirmed that the lithium air batteries of Manufacture Examples 3 and 4 had improved capacity characteristics as compared with that the lithium air battery of Comparative Manufacture Example 3.

4) Manufacture Examples 3, 6, and 7

The lithium air batteries of Manufacture Examples 3, 6, and 7 were subjected to a first charge and discharge cycle at a temperature of 60° C.

The lithium air batteries of Manufacture Examples 3, 6, and 7 were each charged with a constant current of 0.1 C until a voltage thereof reached 4.7 V, and then, discharged with the same constant current until a voltage thereof reached 2.0 V.

Figure 13:
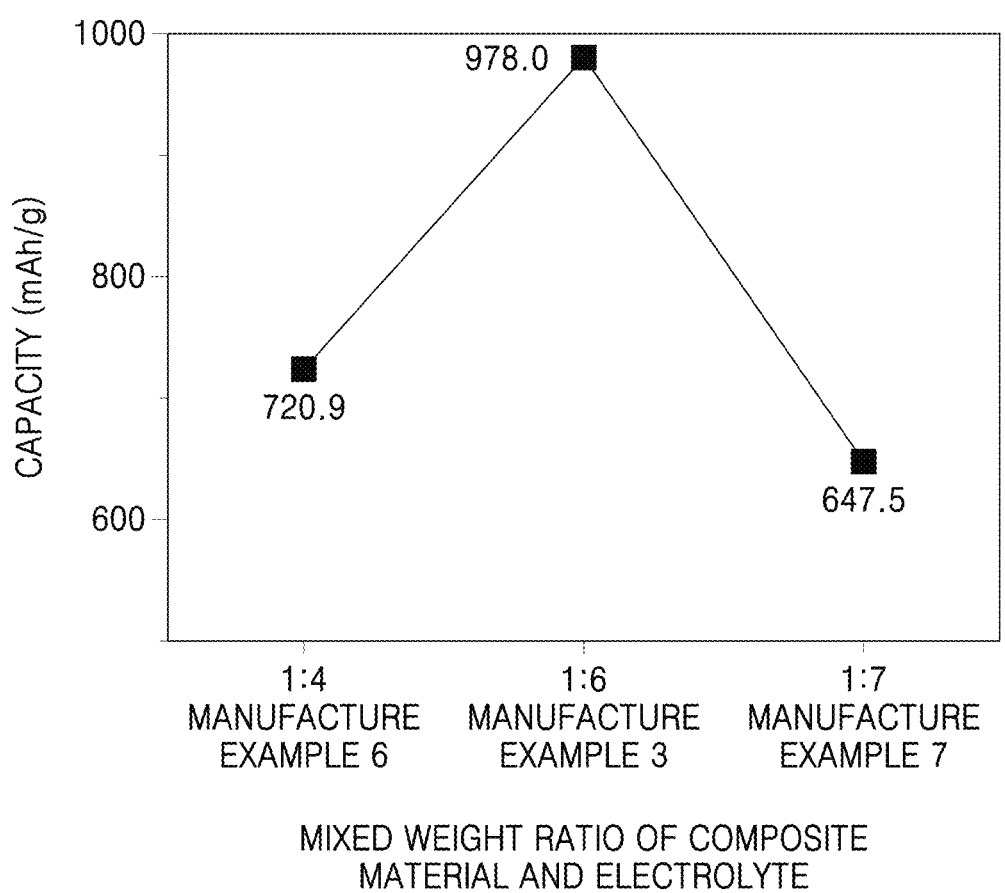
FIG. 13 is a graph showing capacity (mAh/g) characteristics of lithium air batteries prepared in Manufacturing Examples 3, 6, and 7.

The changes in capacities of the lithium air batteries were examined according to the mixing ratio of the composite material to electrolyte, and the results thereof are shown in FIG. 13.

Referring to FIG. 13, it was confirmed that the lithium air battery of Manufacture Example 3 (where a mixing ratio of the composite material to the electrolyte was 1:6) had the highest activity. That is, the composite material for the lithium air battery of Manufacture Example 3 was found that a suitable amount of the electrolyte is required due to its relatively high carbon ratio.

5) Manufacture Example 3 and Comparative Manufacture Examples 4-5

The lithium air batteries of Manufacture Example 3 and Comparative Manufacture Examples 4-5 were subjected to a first charge and discharge cycle at a temperature of 60° C. Here, the lithium air batteries of Manufacture Example 3 and Comparative Manufacture Examples 4-5 included the positive electrode material and the electrolyte at a mixing weight ratio of 1:6.

Figure 14:
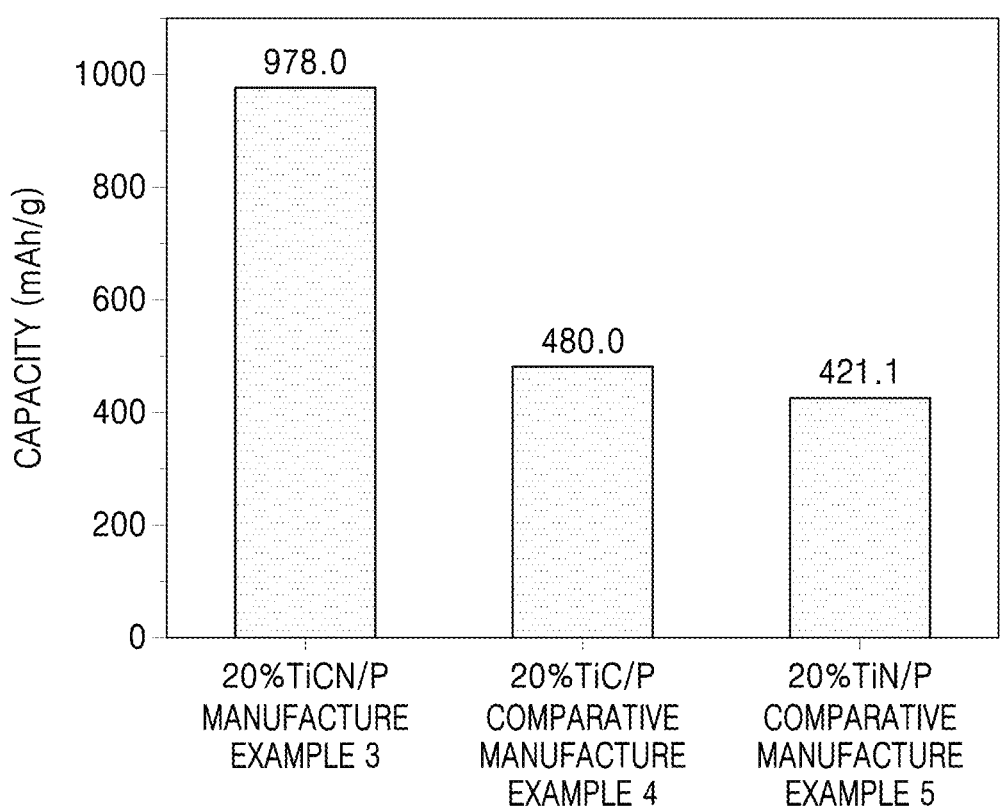
FIG. 14 is a graph showing capacity (mAh/g) characteristics of lithium air batteries prepared in Manufacturing Example 3 and Comparative Manufacturing Examples 4 and 5.

The lithium air batteries of Manufacture Example 3 and Comparative Manufacture Examples 4-5 were each charged with a constant current of 0.1 C until a voltage thereof reached 4.7 V, and then, discharged with the same constant current until a voltage thereof reached 2.0 V. The changes in capacities of the lithium air batteries were examined, and the results thereof are shown in FIG. 14. In FIG. 14, P is an abbreviation for Printex.

Referring to FIG. 14, it was confirmed that the lithium air battery of Manufacture Example 3 had improved capacity characteristics as compared with that the lithium air batteries of Comparative Manufacture Examples 4 and 5. Accordingly, it the case of mixing carbon black with TiC or TiN in manufacturing the positive electrode, the lithium air batteries were found to be degraded in terms of battery performance. In addition, it was confirmed that the capacity characteristics of the lithium air battery was significantly improved when the mixing weight ratio of the positive electrode material to the electrolyte was 1:6.

Evaluation Example 8: Lifespan Characteristics

The lithium air batteries prepared in Manufacture Example 3 and Comparative Manufacture Examples 3 to 5 and 7 were subjected to a first charge and discharge cycle at a temperature of 25° C.

The lithium air batteries were each charged under a constant current of 0.1 until a voltage thereof reached 4.7 V, followed by being discharged under a constant current of 0.1 C until a voltage thereof reached 2.0 V. The charge and discharge cycle was repeated 12 times under the same conditions.

Figure 15:
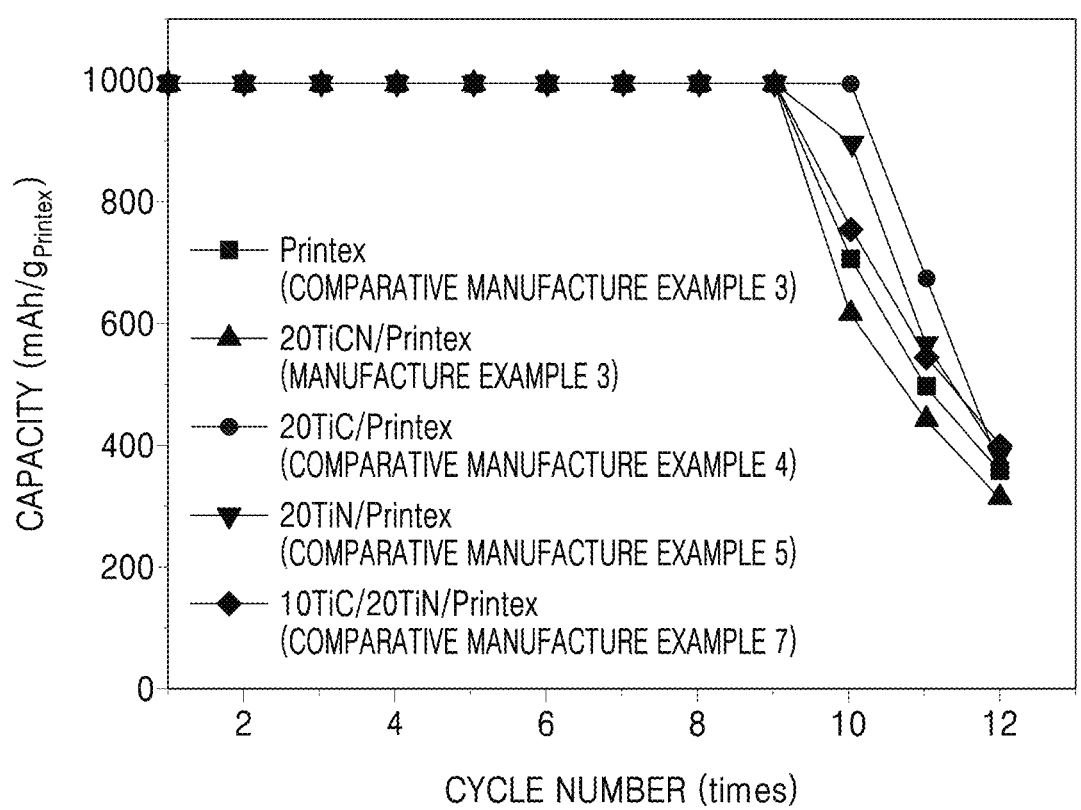
FIG. 15 is a graph of capacity (milliampere-hours per gram) versus cycle number showing capacity changes according to number of cycles in lithium air batteries prepared in Manufacturing Example 3 and Comparative Manufacturing Examples 3, 4, 5, and 7.

After the charge and discharge cycle was repeated 12 times, the lithium air battery was examined in terms of changes in the capacity thereof, and the results are shown in FIG. 15.

Referring to FIG. 15, it was confirmed that the lithium air battery prepared in Manufacture Example 3 had an improved lifespan as compared with the lithium air batteries prepared in Comparative Manufacture Examples 3-5.

As described above, according to the one or more of the above embodiments of the present invention, a composite for a lithium air battery maximizes an active site in a positive electrode and accordingly, improves the activity of the positive electrode. Thus, when a lithium air battery employs the positive electrode including the composite, the lithium air battery may be manufactured to have improved charge and discharge cycle characteristics and stability.

It should be understood that the exemplary embodiments described therein should be considered in a descriptive sense only and not for purposes of limitation. Descriptions of features, advantages, or aspects within each embodiment shall be considered as available for other similar features, advantages, or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A composite for a lithium air battery, wherein the composite is at least one selected from $TiC_{0.1}N_{0.9}$, $TiC_{0.2}N_{0.8}$, $TiC_{0.3}N_{0.7}$, $TiC_{0.5}N_{0.5}$, $TiC_{0.7}N_{0.3}$, $TiC_{0.8}N_{0.2}$, $TiC_{0.9}N_{0.1}$, $WC_{0.1}N_{0.9}$, $WC_{0.2}N_{0.8}$, $WC_{0.3}N_{0.7}$, $WC_{0.5}N_{0.5}$, $WC_{0.7}N_{0.3}$, $WC_{0.8}N_{0.2}$, $WC_{0.9}N_{0.1}$, $MoC_{0.1}N_{0.9}$, $MoC_{0.2}N_{0.8}$, $MoC_{0.3}N_{0.7}$, $MoC_{0.5}N_{0.5}$, $MoC_{0.7}N_{0.3}$, $Mo_{0.8}N_{0.2}$, and $MoC_{0.9}N_{0.1}$.

2. The composite of claim 1, wherein the composite further comprises a carbonaceous coating layer.

3. The composite of claim 2, wherein the carbonaceous coating layer comprises at least one selected from amorphous carbon, crystalline carbon, graphene oxide, reduced graphene oxide, and carbon rods.

4. The composite of claim 2, wherein a thickness of the coating layer is in a range of about 1 nanometer to about 10 nanometers.

5. The composite of claim 1, wherein the composite has a crystalline structure.

6. The composite of claim 1, wherein an average particle size of the composite is in a range of about 10 nanometers to about 100 nanometers, when determined by X-ray diffraction analysis using a Cu—Kα radiation.

7. The composite of claim 1, wherein the composite is porous and has an average pore diameter that is in a range of about 1 nanometer to about 200 nanometers.

8. The composite of claim 1, wherein the composite is in a form of a prismatic shape.

9. The composite of claim 8, wherein the composite is in a form of a rectangular prism shape.

10. The composite of claim 8, wherein the composite is in a form of a cube shape or a rectangular parallelepiped shape.

11. The composite of claim 8, wherein the Ti, W, or Mo, the C element, and the N element of the composite are distributed regularly in a crystalline nanostructure.

12. The composite of claim 8, wherein the composite includes M-C, M-N, and C—N covalent bonds in a crystalline structure, wherein M is selected from Ti, W, and Mo.

13. A method of preparing a composite for a lithium air battery,
wherein the composite is at least one selected from $TiC_{0.1}N_{0.9}$, $TiC_{0.2}N_{0.8}$, $TiC_{0.3}N_{0.7}$, $TiC_{0.5}N_{0.5}$, $TiC_{0.7}N_{0.3}$, $TiC_{0.8}N_{0.2}$, $TiC_{0.9}N_{0.1}$, $WC_{0.1}N_{0.9}$, $WC_{0.2}N_{0.8}$, $WC_{0.3}N_{0.7}$, $WC_{0.5}N_{0.5}$, $WC_{0.7}N_{0.3}$, $WC_{0.8}N_{0.2}$, $WC_{0.9}N_{0.1}$, $MoC_{0.1}N_{0.9}$, $MoC_{0.2}N_{0.8}$, $MoC_{0.3}N_{0.7}$, $MoC_{0.5}N_{0.5}$, $MoC_{0.7}N_{0.3}$, $Mo_{0.8}N_{0.2}$, and $MoC_{0.9}N_{0.1}$,
the method comprising:
polymerizing a composition comprising a polymeric monomer, a compound including a formyl group, a precursor comprising at least one selected from a metal element and a metalloid element, and a solvent to form a polymeric intermediate;
drying the polymeric intermediate at a temperature of about 25° C. to about 100° C. to form a dried polymeric intermediate; and
heat-treating the dried polymeric intermediate to prepare the composite.

14. The method of claim 13, wherein the polymeric monomer is at least one selected from melamine, urea, hydrogen cyanide, cyromazine, acetonitrile, acrylonitrile, resorcinol, phenol, fururyl alcohol, biphenyl, and sucrose.

15. The method of claim 13, wherein the compound including a formyl group is at least one selected from formaldehyde, formic acid, formamide, and paraformaldehyde.

16. The method of claim 13, wherein the composition is prepared by
mixing a first solvent with a precursor including at least one selected from a metal element and a metalloid element to form a precursor mixture; and then adding the precursor mixture to a mixture comprising the polymeric monomer, the compound including the formyl group, and a second solvent to form the composition.

17. The method of claim 13, wherein the method further comprises:
adding a nitrogen precursor to the composition before the polymerizing.

18. The method of claim 13, wherein the heat-treating is performed at a temperature in a range of about 400° C. to about 1,400° C. under an inert gas atmosphere.

19. The method of claim 13, wherein an amount of the compound including the formyl group is in a range of about 1 mole to about 100 moles, based on 1 mole of the polymeric monomer.

20. A lithium air battery comprising a positive electrode comprising the composite of claim 1.

21. The lithium air battery of claim 20, wherein the positive electrode further comprises a carbonaceous material.

22. A positive electrode comprising:
a current collector; and
a composite, wherein the composite is at least one selected from $TiC_{0.1}N_{0.9}$, $TiC_{0.2}N_{0.8}$, $TiC_{0.3}N_{0.7}$, $TiC_{0.5}N_{0.5}$, $TiC_{0.7}N_{0.3}$, $TiC_{0.8}N_{0.2}$, $TiC_{0.9}N_{0.1}$, $WC_{0.1}N_{0.9}$, $WC_{0.2}N_{0.8}$, $WC_{0.3}N_{0.7}$, $WC_{0.5}N_{0.5}$, $WC_{0.7}N_{0.3}$, $WC_{0.8}N_{0.2}$, $WC_{0.9}N_{0.1}$, $MoC_{0.1}N_{0.9}$, $MoC_{0.2}N_{0.8}$, $MoC_{0.3}N_{0.7}$, $MoC_{0.5}N_{0.5}$, $MoC_{0.7}N_{0.3}$, $Mo_{0.8}N_{0.2}$, and $MoC_{0.9}N_{0.1}$ represented by Formula 1.

23. The positive electrode of claim 22, further comprising a binder.

24. The positive electrode of claim 23, wherein the composite further comprises an electrolyte.

25. The positive electrode of claim 24, wherein the electrolyte is disposed within one or more pores of the composite.

26. The composite of claim 1, wherein the electrolyte is disposed within one or more pores of the composite.

* * * * *